US007650621B2

(12) United States Patent  (10) Patent No.: US 7,650,621 B2
Thomas et al.  (45) Date of Patent: Jan. 19, 2010

(54) SYSTEMS AND METHODS FOR PROVIDING STORAGE OF DATA ON SERVERS IN AN ON-DEMAND MEDIA DELIVERY SYSTEM

(75) Inventors: William L. Thomas, Bixby, OK (US); Michael D. Ellis, Boulder, CO (US); Kevin B. Easterbrook, Monument, CO (US); M. Scott Reichardt, Tulsa, OK (US); Robert A. Knee, Lansdale, PA (US)

(73) Assignee: United Video Properties, Inc., Los Angeles, CA (US)

( * ) Notice: Subject to any disclaimer, the term of this patent is extended or adjusted under 35 U.S.C. 154(b) by 1511 days.

(21) Appl. No.: 09/974,646

(22) Filed: Oct. 9, 2001

(65) Prior Publication Data

US 2002/0059621 A1    May 16, 2002

Related U.S. Application Data

(60) Provisional application No. 60/270,351, filed on Feb. 21, 2001, provisional application No. 60/252,171, filed on Nov. 20, 2000, provisional application No. 60/239,407, filed on Oct. 11, 2000.

(51) Int. Cl.
*H04N 7/173* (2006.01)
(52) U.S. Cl. ............................. 725/87; 725/91; 725/97
(58) Field of Classification Search .................. 725/87, 725/91, 97
See application file for complete search history.

(56) References Cited

U.S. PATENT DOCUMENTS

| | | | |
|---|---|---|---|
| 4,355,415 A | 10/1982 | George et al. | |
| 4,488,179 A | 12/1984 | Krüger et al. | |
| 4,602,279 A | 7/1986 | Freeman | |
| 4,694,490 A | 9/1987 | Harvey et al. | |

(Continued)

FOREIGN PATENT DOCUMENTS

EP    0 424 469 B1    5/1991

(Continued)

OTHER PUBLICATIONS

CableData brochure, "A New Approach To Addressability" (undated).

(Continued)

*Primary Examiner*—Hunter B. Lonsberry
(74) *Attorney, Agent, or Firm*—Ropes & Gray LLP

(57) ABSTRACT

A system and method may be provided that allows users to store, retrieve, and manipulate on-demand media content and data stored on a remote server network in an on-demand media delivery system. More particularly, the system may allow a user to access his or her on-demand media account from user equipment in different locations as long as the current user equipment can communicate with a remote server that stores user-specific information. The system upon user selection may freeze the delivery of on-demand media at a particular point and allow the user to resume the media at a later time from some other network location in system. Users may upload personal images or files to an on-demand delivery server for later retrieval and display. Users may be permitted to assign access rights to the uploaded files.

92 Claims, 14 Drawing Sheets

U.S. PATENT DOCUMENTS

| | | | |
|---|---|---|---|
| 4,704,725 A | 11/1987 | Harvey et al. | |
| 4,706,121 A | 11/1987 | Young | |
| 4,718,107 A | 1/1988 | Hayes | |
| 4,745,549 A | 5/1988 | Hashimoto | |
| 4,751,578 A | 6/1988 | Reiter et al. | |
| 4,787,063 A | 11/1988 | Muguet | |
| 4,847,698 A | 7/1989 | Freeman | |
| 4,857,999 A | 8/1989 | Welsh | |
| 4,908,707 A | 3/1990 | Kinghorn | |
| 4,930,158 A | 5/1990 | Vogel | |
| 4,959,720 A | 9/1990 | Duffield et al. | |
| 4,963,994 A | 10/1990 | Levine | |
| 4,965,825 A | 10/1990 | Harvey et al. | |
| 4,977,455 A | 12/1990 | Young | |
| 5,027,400 A | 6/1991 | Baji et al. | |
| 5,047,867 A | 9/1991 | Strubbe et al. | |
| 5,109,279 A | 4/1992 | Ando | |
| 5,109,414 A | 4/1992 | Harvey et al. | |
| 5,134,719 A | 7/1992 | Mankovitz | |
| 5,151,789 A | 9/1992 | Young | |
| 5,155,591 A | 10/1992 | Wachob | |
| 5,172,413 A | 12/1992 | Bradley et al. | |
| 5,200,822 A | 4/1993 | Bronfin et al. | |
| 5,231,493 A | 7/1993 | Apitz | |
| 5,233,654 A | 8/1993 | Harvey et al. | |
| 5,249,043 A | 9/1993 | Grandmougin | |
| 5,299,006 A | 3/1994 | Kim | |
| 5,335,277 A | 8/1994 | Harvey et al. | |
| 5,339,434 A | 8/1994 | Rusis | |
| 5,341,350 A | 8/1994 | Frank et al. | |
| 5,353,121 A | 10/1994 | Young et al. | |
| 5,357,276 A | 10/1994 | Banker et al. | |
| 5,404,567 A | 4/1995 | DePietro et al. | |
| 5,410,344 A | 4/1995 | Graves et al. | |
| 5,426,699 A | 6/1995 | Wunderlich et al. | |
| 5,442,389 A | 8/1995 | Blahut et al. | |
| 5,461,415 A | 10/1995 | Wolf et al. | |
| 5,465,385 A | 11/1995 | Ohga et al. | |
| 5,502,504 A | 3/1996 | Marshall et al. | |
| 5,517,257 A | 5/1996 | Dunn et al. | |
| 5,523,794 A | 6/1996 | Mankovitz et al. | |
| 5,524,195 A | 6/1996 | Clanton, III et al. | |
| 5,524,271 A | 6/1996 | Hollmann et al. | |
| 5,537,141 A | 7/1996 | Harper et al. | |
| 5,539,449 A | 7/1996 | Blahut et al. | |
| 5,539,880 A | 7/1996 | Lakhani | |
| 5,541,638 A | 7/1996 | Story | |
| 5,541,738 A | 7/1996 | Mankovitz | |
| 5,548,338 A | 8/1996 | Ellis et al. | |
| 5,550,576 A | 8/1996 | Klosterman | |
| 5,550,825 A | 8/1996 | McMullan, Jr. et al. | |
| 5,557,338 A | 9/1996 | Maze et al. | |
| 5,559,548 A | 9/1996 | Davis et al. | |
| 5,559,549 A | 9/1996 | Hendricks et al. | |
| 5,574,778 A | 11/1996 | Ely et al. | |
| 5,576,755 A | 11/1996 | Davis et al. | |
| 5,583,561 A | 12/1996 | Baker et al. | |
| 5,583,563 A | 12/1996 | Wanderscheid et al. | |
| 5,585,838 A | 12/1996 | Lawler et al. | |
| 5,592,551 A | 1/1997 | Lett et al. | |
| 5,594,509 A | 1/1997 | Florin et al. | |
| 5,594,779 A | 1/1997 | Goodman | |
| 5,602,582 A | 2/1997 | Wanderscheid et al. | |
| 5,606,642 A | 2/1997 | Stautner et al. | |
| 5,610,653 A * | 3/1997 | Abecassis | 725/30 |
| 5,616,876 A | 4/1997 | Cluts | |
| 5,619,247 A | 4/1997 | Russo | |
| 5,619,249 A | 4/1997 | Billock et al. | |
| 5,619,274 A | 4/1997 | Roop et al. | |
| 5,623,613 A | 4/1997 | Rowe et al. | |
| 5,625,678 A | 4/1997 | Blomfield-Brown | |
| 5,629,867 A | 5/1997 | Goldman | |
| 5,630,119 A | 5/1997 | Aristides et al. | |
| 5,632,007 A | 5/1997 | Freeman | |
| 5,635,987 A | 6/1997 | Park et al. | |
| 5,648,824 A | 7/1997 | Dunn et al. | |
| 5,652,613 A | 7/1997 | Lazarus et al. | |
| 5,654,748 A | 8/1997 | Matthews, III | |
| 5,654,886 A | 8/1997 | Zereski, Jr. et al. | |
| 5,657,072 A | 8/1997 | Aristides et al. | |
| 5,666,645 A | 9/1997 | Thomas et al. | |
| 5,671,377 A | 9/1997 | Bleidt et al. | |
| 5,675,743 A | 10/1997 | Mavity | |
| 5,694,163 A | 12/1997 | Harrison | |
| 5,696,765 A | 12/1997 | Safadi | |
| 5,708,961 A | 1/1998 | Hylton et al. | |
| 5,710,601 A | 1/1998 | Marshall et al. | |
| 5,717,452 A | 2/1998 | Janin et al. | |
| 5,721,829 A | 2/1998 | Dunn et al. | |
| 5,727,060 A | 3/1998 | Young | |
| 5,732,216 A | 3/1998 | Logan et al. | |
| 5,734,119 A | 3/1998 | France et al. | |
| 5,742,443 A | 4/1998 | Tsao et al. | |
| 5,745,710 A | 4/1998 | Clanton, III et al. | |
| 5,751,282 A | 5/1998 | Girard et al. | |
| 5,752,159 A | 5/1998 | Faust et al. | |
| 5,752,160 A | 5/1998 | Dunn | |
| 5,754,771 A | 5/1998 | Epperson et al. | |
| 5,758,257 A | 5/1998 | Herz et al. | |
| 5,758,258 A | 5/1998 | Shoff et al. | |
| 5,758,259 A | 5/1998 | Lawler | |
| 5,760,821 A | 6/1998 | Ellis et al. | |
| 5,768,528 A | 6/1998 | Stumm | |
| 5,771,354 A | 6/1998 | Crawford et al. | |
| 5,774,170 A | 6/1998 | Hite et al. | |
| 5,778,182 A | 7/1998 | Cathey et al. | |
| 5,778,187 A | 7/1998 | Monteiro et al. | |
| 5,781,226 A | 7/1998 | Sheehan | |
| 5,781,227 A | 7/1998 | Goode et al. | |
| 5,790,198 A | 8/1998 | Roop et al. | |
| 5,790,423 A | 8/1998 | Lau et al. | |
| 5,793,412 A | 8/1998 | Asamizuya | |
| 5,793,971 A | 8/1998 | Fujita et al. | |
| 5,794,217 A | 8/1998 | Allen | |
| 5,796,952 A | 8/1998 | Davis et al. | |
| 5,802,284 A | 9/1998 | Karlton et al. | |
| 5,805,154 A | 9/1998 | Brown | |
| 5,805,763 A | 9/1998 | Lawler et al. | |
| 5,805,804 A | 9/1998 | Laursen et al. | |
| 5,805,806 A | 9/1998 | McArthur | |
| 5,808,608 A | 9/1998 | Young et al. | |
| 5,808,694 A | 9/1998 | Usui et al. | |
| 5,809,246 A | 9/1998 | Goldman | |
| 5,812,123 A | 9/1998 | Rowe et al. | |
| 5,812,205 A | 9/1998 | Milnes et al. | |
| 5,815,146 A | 9/1998 | Youden et al. | |
| 5,818,438 A | 10/1998 | Howe et al. | |
| 5,819,019 A | 10/1998 | Nelson | |
| 5,819,160 A | 10/1998 | Foladare et al. | |
| 5,822,530 A | 10/1998 | Brown | |
| RE35,954 E | 11/1998 | Levine | |
| 5,841,979 A | 11/1998 | Schulhof et al. | |
| 5,844,620 A | 12/1998 | Coleman et al. | |
| 5,850,218 A | 12/1998 | LaJoie et al. | |
| 5,861,906 A | 1/1999 | Dunn et al. | |
| 5,881,245 A | 3/1999 | Thompson | |
| 5,884,028 A | 3/1999 | Kindell et al. | |
| 5,884,141 A * | 3/1999 | Inoue et al. | 725/101 |
| 5,886,707 A | 3/1999 | Berg | |
| 5,886,732 A | 3/1999 | Humpleman | |
| 5,887,243 A | 3/1999 | Harvey et al. | |
| 5,892,915 A | 4/1999 | Duso et al. | |
| 5,894,589 A | 4/1999 | Reber et al. | |
| 5,896,414 A | 4/1999 | Meyer et al. | |

| | | |
|---|---|---|
| 5,898,441 A | 4/1999 | Flurry |
| 5,898,456 A | 4/1999 | Wahl |
| 5,899,582 A | 5/1999 | DuLac |
| 5,900,904 A | 5/1999 | Okada et al. |
| 5,903,234 A | 5/1999 | Kimura |
| 5,903,263 A | 5/1999 | Emura |
| 5,903,264 A | 5/1999 | Moeller et al. |
| 5,905,522 A | 5/1999 | Lawler |
| 5,905,847 A | 5/1999 | Kobayashi et al. |
| 5,909,638 A | 6/1999 | Allen |
| 5,911,046 A | 6/1999 | Amano |
| 5,913,039 A | 6/1999 | Nakamura et al. |
| 5,914,941 A | 6/1999 | Janky |
| 5,915,090 A | 6/1999 | Joseph et al. |
| 5,915,094 A | 6/1999 | Kouloheris et al. |
| 5,916,303 A | 6/1999 | Scott |
| 5,917,538 A | 6/1999 | Asamizuya |
| 5,917,835 A | 6/1999 | Barrett et al. |
| 5,920,702 A | 7/1999 | Bleidt et al. |
| 5,920,800 A | 7/1999 | Schäfer |
| 5,922,045 A | 7/1999 | Hanson |
| 5,922,048 A | 7/1999 | Emura |
| 5,923,361 A | 7/1999 | Sutton, Jr. |
| 5,926,204 A | 7/1999 | Mayer |
| 5,926,205 A | 7/1999 | Krause et al. |
| 5,926,624 A | 7/1999 | Katz et al. |
| 5,928,327 A | 7/1999 | Wang et al. |
| 5,929,850 A | 7/1999 | Broadwin et al. |
| 5,930,473 A | 7/1999 | Teng et al. |
| 5,930,493 A | 7/1999 | Ottesen et al. |
| 5,931,901 A | 8/1999 | Wolfe et al. |
| 5,933,603 A | 8/1999 | Vahalia et al. |
| 5,933,835 A | 8/1999 | Adams et al. |
| 5,935,206 A | 8/1999 | Dixon et al. |
| 5,936,569 A | 8/1999 | Ståhle et al. |
| 5,940,071 A | 8/1999 | Treffers et al. |
| 5,940,073 A | 8/1999 | Klosterman et al. |
| 5,943,046 A | 8/1999 | Cave et al. |
| 5,943,047 A | 8/1999 | Suzuki |
| 5,945,987 A | 8/1999 | Dunn |
| 5,947,746 A | 9/1999 | Tsai |
| 5,949,411 A | 9/1999 | Doerr et al. |
| 5,956,482 A | 9/1999 | Agraharam et al. |
| 5,959,659 A | 9/1999 | Dokic |
| 5,963,202 A | 10/1999 | Polish |
| 5,964,455 A | 10/1999 | Catanzarite et al. |
| 5,969,714 A | 10/1999 | Butcher |
| 5,973,680 A | 10/1999 | Ueda |
| 5,973,722 A | 10/1999 | Wakai et al. |
| 5,974,217 A | 10/1999 | Haraguchi |
| 5,977,963 A | 11/1999 | Gaughan et al. |
| 5,978,567 A | 11/1999 | Rebane et al. |
| 5,978,843 A | 11/1999 | Wu et al. |
| 5,986,650 A | 11/1999 | Ellis et al. |
| 5,990,881 A | 11/1999 | Inoue et al. |
| 5,999,970 A | 12/1999 | Krisbergh et al. |
| 6,002,394 A | 12/1999 | Schein et al. |
| 6,002,720 A | 12/1999 | Yurt et al. |
| 6,005,564 A | 12/1999 | Ahmad et al. |
| 6,005,600 A | 12/1999 | Hill |
| 6,009,465 A | 12/1999 | Decker et al. |
| 6,012,089 A | 1/2000 | Hasegawa |
| 6,012,091 A | 1/2000 | Boyce |
| 6,014,381 A | 1/2000 | Troxel et al. |
| 6,014,693 A | 1/2000 | Ito et al. |
| 6,014,694 A | 1/2000 | Aharoni et al. |
| 6,014,706 A | 1/2000 | Cannon et al. |
| 6,018,359 A | 1/2000 | Kermode et al. |
| 6,018,765 A | 1/2000 | Durana et al. |
| 6,020,912 A | 2/2000 | De Lang |
| 6,022,223 A | 2/2000 | Taniguchi et al. |
| 6,023,725 A | 2/2000 | Ozawa et al. |
| 6,025,868 A | 2/2000 | Russo |
| 6,028,600 A | 2/2000 | Rosin et al. |
| 6,029,064 A | 2/2000 | Farris et al. |
| 6,038,591 A | 3/2000 | Wolfe et al. |
| 6,052,145 A | 4/2000 | Macrae et al. |
| 6,141,488 A | 10/2000 | Knudson et al. |
| 6,160,546 A | 12/2000 | Thompson et al. |
| 6,166,730 A * | 12/2000 | Goode et al. ................. 715/716 |
| 6,208,335 B1 | 3/2001 | Gordon et al. |
| 6,314,575 B1 | 11/2001 | Billock et al. |
| 6,816,904 B1 * | 11/2004 | Ludwig et al. ............... 725/145 |
| 2002/0069218 A1 * | 6/2002 | Sull et al. ................. 707/501.1 |
| 2003/0070182 A1 * | 4/2003 | Pierre et al. ................. 725/135 |

FOREIGN PATENT DOCUMENTS

| | | |
|---|---|---|
| EP | 0 535 749 A2 | 4/1993 |
| EP | 0 572 090 A2 | 12/1993 |
| EP | 0 605 115 | 7/1994 |
| EP | 0 624 039 A2 | 11/1994 |
| EP | 0 662 771 A1 | 7/1995 |
| EP | 0 682 452 A2 | 11/1995 |
| EP | 0 711 076 A2 | 5/1996 |
| EP | 0 725 539 A2 | 8/1996 |
| EP | 0 758 833 | 2/1997 |
| EP | 0 763 938 A2 | 3/1997 |
| EP | 0 424 469 B1 | 5/1997 |
| EP | 0 854 645 A2 | 7/1998 |
| EP | 0 874 524 A1 | 10/1998 |
| EP | 0 924 927 A2 | 6/1999 |
| EP | 0 944 253 A1 | 9/1999 |
| EP | 0 944 257 | 9/1999 |
| EP | 0 986 046 A1 | 3/2000 |
| GB | 2 256 115 | 11/1992 |
| JP | 60061935 | 9/1985 |
| JP | 07-336318 | 12/1995 |
| JP | 09-214873 | 8/1997 |
| JP | 11-177962 | 7/1999 |
| KR | 1999-0086454 | 12/1999 |
| RO | 247388 | 10/1994 |
| WO | WO 88/04507 | 6/1988 |
| WO | WO 89/12370 | 12/1989 |
| WO | WO 90/00847 | 1/1990 |
| WO | WO 91/00670 | 1/1991 |
| WO | WO 91/07050 | 5/1991 |
| WO | WO 92/04801 | 3/1992 |
| WO | WO 93/08542 | 4/1993 |
| WO | WO 93/22877 | 11/1993 |
| WO | WO 95/01058 | 1/1995 |
| WO | WO 95/15658 | 6/1995 |
| WO | WO 95/31069 | 11/1995 |
| WO | WO 95/32583 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/17467 | 6/1996 |
| WO | WO 96/25821 | 8/1996 |
| WO | WO 96/33572 | 10/1996 |
| WO | WO 96/34467 | 10/1996 |
| WO | WO 96/41472 | 12/1996 |
| WO | WO 97/13368 | 4/1997 |
| WO | WO 97/21291 | 6/1997 |
| WO | WO 97/32434 | 9/1997 |
| WO | WO 97/34413 | 9/1997 |
| WO | WO 97/34414 | 9/1997 |
| WO | WO 97/37500 | 10/1997 |
| WO | WO 97/42763 | 11/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/49237 | 12/1997 |
| WO | WO 98/01995 | 1/1998 |

| | | |
|---|---|---|
| WO | WO 98/07277 | 2/1998 |
| WO | WO 98/10589 | 3/1998 |
| WO | WO 98/12872 | 3/1998 |
| WO | WO 98/17033 | 4/1998 |
| WO | WO 98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/31115 | 7/1998 |
| WO | WO 98/31116 | 7/1998 |
| WO | WO 98/34405 | 8/1998 |
| WO | WO 98/38831 | 9/1998 |
| WO | WO 98/47279 | 10/1998 |
| WO | WO 98/48566 | 10/1998 |
| WO | WO 99/03267 | 1/1999 |
| WO | WO 99/04561 | 1/1999 |
| WO | WO 99/11060 | 3/1999 |
| WO | WO 99/12320 | 3/1999 |
| WO | WO 99/27681 | 6/1999 |
| WO | WO 99/28897 | 6/1999 |
| WO | WO 99/39466 | 8/1999 |
| WO | WO 99/56473 | 11/1999 |
| WO | WO 99/60790 | 11/1999 |
| WO | WO 99/65244 | 12/1999 |
| WO | WO 99/66725 | 12/1999 |
| WO | WO 00/04706 | 1/2000 |
| WO | WO 00/05885 | 2/2000 |
| WO | WO 00/11869 | 3/2000 |
| WO | WO 00/16548 | 3/2000 |
| WO | WO 00/30345 | 5/2000 |
| WO | WO 00/33560 | 6/2000 |
| WO | WO 01/01677 A1 | 1/2001 |
| WO | WO 01/01689 A1 | 1/2001 |
| WO | WO 01/35662 A1 | 5/2001 |
| WO | WO 01/50743 A1 | 7/2001 |

OTHER PUBLICATIONS

"Addressable Converters: A New Development at CableData," Via Cable, vol. 1, No. 12 (Dec. 1981).

Hofmann, et al., "Videotext Programmiert Videorecorder," Rundfunktechnische Mitteilungen, Nov.-Dec. 1982, pp. 254-257 (translation abstract attached).

Sorce, J. et al., "Designing a Broadband Residential Entertainment Service: A Case Study," 13th International Symposium Human Factors in Telecommunications, Torino, Italy, Sep. 10-14, 1990 pp. 141-148.

BrugLiera, V. "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).

Miller, M. D. "A Scenario for the Deployment of Interactive Multimedia Cable Television Systems in the United States in the 1990's," Proceedings of the IEEE, vol. 82, No. 4, pp. 585-589 (Apr. 1994).

Chang, Y., et al., "An Open-Systems Approach to Video on Demand," IEEE Communications Magazine, vol. 32, No. 5 pp. 68-80 (May 1994).

"Electronic Programme Guide (EPG); Protocol for a TV Guide using electronic data transmission" by European Telecommunication Standards Institute, May 1997, Valbonne, France, publication No. ETS 300 707.

Patent abstract for Japanese patent Publication No. JP 10 065978, Patent Abstracts of Japan, vol. 1998, No. 08, Jun. 3, 1998.

Article: "Windows 98 Feature Combines TV, Terminal and the Internet", New York Times, Aug. 18, 1998.

The New York Times Website Article, "2 Makers Plan Introductions of Digital VCR", by John Markoff, Mar. 29, 1999.

David M. Rudnick, U.S. Appl. No. 09/283,681, filed Apr. 1, 1999, entitled Interactive Television Program Guide System Having Graphic Arrangements of Program Event Regions.

Patent abstract for Japanese patent JP Publication No. 11 032272, Patent Abstracts of Japan, vol. 1999, No. 05, Feb. 2, 1999.

Patent abstract for Japanese patent JP Publication No. 11 205711, Patent Abstracts of Japan, vol. 1999, No. 12, Jul. 30, 1999.

"Digital Video Broadcasting (DVB); DVB specification for data broadcasting", European Telecommunications Standards Institute, Draft EN 301 192 V1.2.1 (Jan. 1999).

Li et al., "Distributed Multimedia Systems," *Proceedings of the IEEE* vol. 85 No. 7: pp. 1063-1108 (Jul. 1997).

S. Gondow, et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.

F. Teraoka et al., "Host Migration Transparancy in IP networks: The VIP Approach" ACM SIGCOMM- Computer Communication Review, ACM Press, New York, NY, USA, Jan. 1993, pp. 45-65.

A. C. Snoeren et al., "An End-to-End Approach to Host Mobility" 6th ACM/IEEE International Conference on Mobile Computing and Networking (MOBICOM 2000), Boston, MA, USA, Aug. 2000, pp. 1-12.

* cited by examiner

SYSTEMS AND METHODS FOR PROVIDING STORAGE OF DATA ON SERVERS IN AN ON-DEMAND MEDIA DELIVERY SYSTEM

CROSS REFERENCE TO RELATED APPLICATIONS

This application claims the benefit of U.S. Provisional Patent Application No. 60/239,407 filed Oct. 11, 2000, U.S. Provisional Patent Application No. 60/252,171 filed Nov. 20, 2000, and U.S. Provisional Patent Application No. 60/270,351, filed Feb. 21, 2001 which are hereby incorporated by reference herein in their entirety.

BACKGROUND OF THE INVENTION

The present invention relates to on-demand media delivery systems and more particularly, to on-demand media delivery systems that have user-related memory for providing system enhancements.

In some known video on-demand systems, a set-top box may be used to receive on-demand video from cable system headends. Such set-top boxes may communicate or may deliver the video and/or other functionality to television sets, VCRs, or other local devices. These systems have been deficient in allowing users to relocate their video-on-demand service to different locations. These systems may have also been deficient in providing adequate relocation techniques, deficient in allowing users to upload and access their personal videos, graphics, images, or photographs and deficient in allowing users to share media.

Systems have been developed that use hard disk technology or other recording technology to store videos of programs locally. Examples of hard disk systems are described, in Hassell et al. U.S. patent application Ser. No. 09/157,256 filed Sep. 17, 1998, which is hereby incorporated by reference herein in its entirety. Hard-disk based products have also been developed by TiVo, Inc. of Sunnyvale, Calif., and Replay Networks, Inc. of Mountainview, Calif. These systems have been deficient in meeting user needs. For example, these systems do not allow the user to relocate to other households with continued access to the recorded materials.

Television platforms have also been developed that include a return path from a user's set-top box to a cable system headend. For example, client-server based program guides have been developed in which set-top boxes are in client-server arrangements with the cable system headends. These arrangements allow for two-way communication between the cable system headends and set-top boxes. These servers typically provide program listings information (e.g., program titles and broadcast times) to the set-top boxes in response to requests generated from the set-top boxes. Client-server television program guides have also been developed where programming and settings may be recorded on a remote server. These known systems have been deficient in various ways. For example, servers in such systems (servers at the cable system headends) have been deficient in providing sufficient mobility features.

SUMMARY OF THE INVENTION

In accordance with the principles of the present invention, on-demand media delivery systems and methods may be provided for remote storage of personal media of users, for sharing of stored media and for features for relocating media-on-demand services. Such features and functionality may be provided based on storing user related information on an on-demand media delivering server. Such features may be provided independent of the type of equipment (e.g., set-top box, personal computer, etc.) that is used to interact with the system.

The system may have a relocate feature that may allow a user to freeze on-demand media delivery on one user equipment and resume delivery and viewing from another user equipment (e.g., user equipment in a household that is different from the household where that user was previously watching the on-demand media delivery content when that user froze the delivery). On demand media content that is presented in a live feed may be remotely recorded for a user when a user selects to freeze the delivery of the media content.

User-specific data may sometimes be stored in a user profile. The system may allow a user profile to be remotely accessed and manipulated by a user when that user has been identified by the system. A user may also upload or download any type of data, file, or program between local user equipment and a server in the on-demand media system. Uploaded data, files, or programs may be assigned private access rights or assigned public or group access rights. Access rights may include the right to read, write, manipulate, upload, or download data, files or programs.

An auto-customization feature may be included in the on-demand media system. An on-demand media system may use stored user equipment preferences to configure and customize user equipment. The user equipment may be configured or customized when a user logs in from practically any user equipment in the system. User equipment preferences may, for example, include volume settings, preferred program settings, menu configurations, and channel block settings.

These and other features and functionalities that take advantage of the special capabilities of on-demand media servers and take advantage of storing user related information and/or personal media on an on-demand media server are also described below.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION

Figure 1:
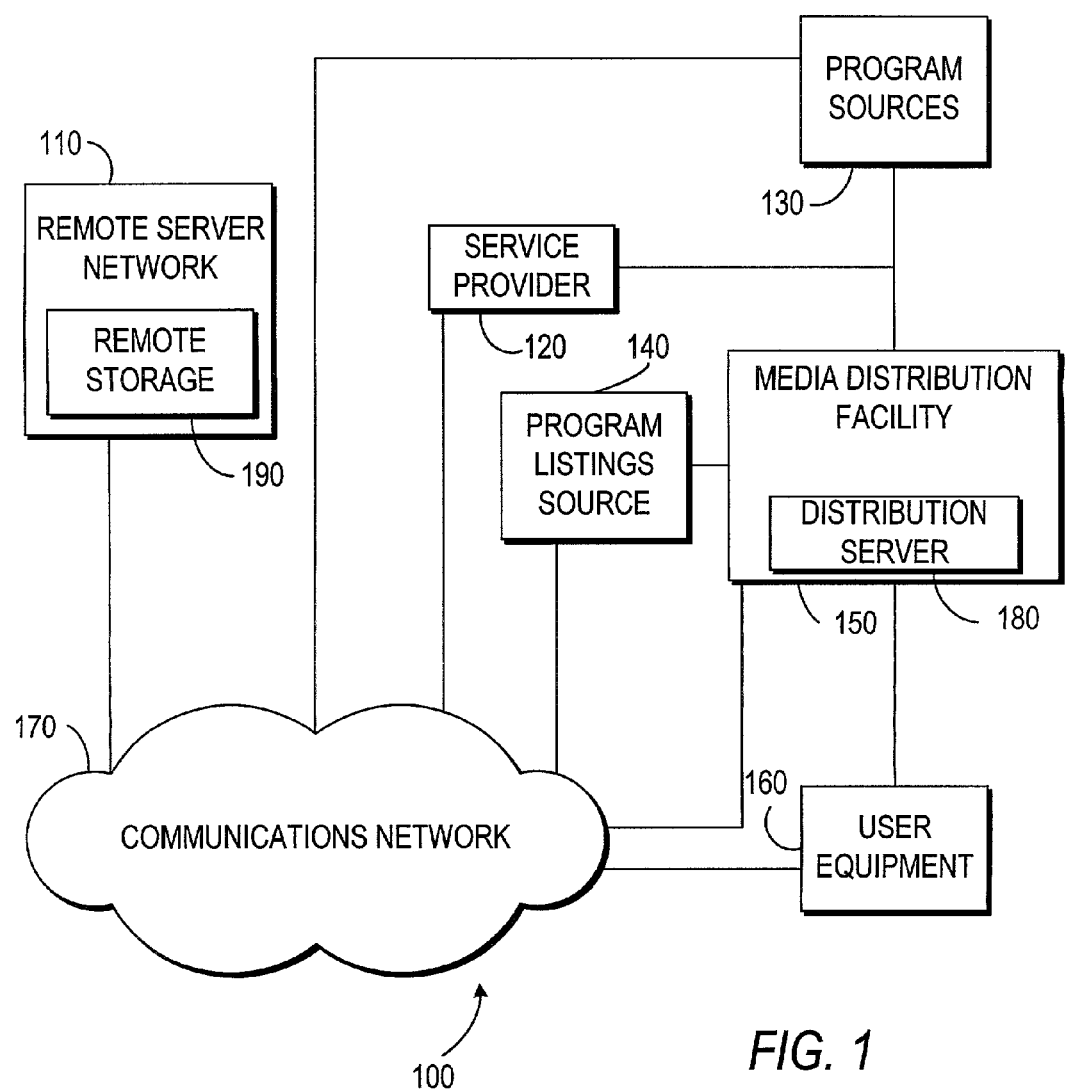
FIG. 1 is a diagram that is illustrative of a network topology of an on-demand media delivery system in accordance with the principles of the present invention.

Turning first to FIG. 1, network topology 100 shows one embodiment of a system architecture for an on-demand media delivery system in accordance with the principles of the present invention. Included in network topology 100 may be any number of remote server networks 110, service providers 120, program sources 130, program listings sources 140, media distribution facilities 150, user equipment 160, communications networks 170, distribution servers 180, and remote storage devices 190.

Media may be provided from programming sources 130 to media distribution facilities such as media distribution facility 150 either directly or through communications network 170. Programming sources 130 may be any suitable source of television or music programming, such as television and music production studios, etc. Additionally, programming sources 130 may provide programming that is to be broadcast according to a schedule (e.g., a schedule that is published in advance).

On-demand media programming may be provided using distribution server 180 or other suitable on-demand media equipment. On-demand media servers or VOD servers may be servers that are tailored towards storing, manipulating, and processing images and videos. Distribution server 180 may include a plurality of servers wherein some of which are specialized servers for supporting on-demand media services. If desired, distribution server 180 or other on-demand media equipment may be located at network nodes associated with media distribution facility 150 or other suitable locations in network topology 100.

Media distribution facility 150 may be a cable system headend, a satellite television distribution facility, a television broadcast facility, or any other suitable facility for distributing on-demand media content, television, and music programming to users.

Media distribution facility 150 may also be connected to various user equipment 160. Such user equipment 160 may, for example, be located in the homes of users. User equipment 160 may include, for example, user television equipment, user computer equipment, and user audio equipment.

User equipment 160 may receive television and music programming, on-demand media programs, and other information from media distribution facility 150 either directly or through communications network 170. User equipment 160 may also transmit and receive signals from media distribution facility 150, remote server network 110, and any other device in network topology 100 through communications network 170.

Program listings source 140 may be used to provide user equipment with television program listings information such as scheduled broadcast times, titles, channels, ratings information (e.g., parental ratings and critic's ratings), detailed title descriptions, genre or category information (e.g., sports, news, movies, etc.), information on actors and actresses, running times, etc. Program listings source 140 may provide program listings information to television distribution facility 150 either directly or indirectly through communications network 170.

User equipment 160 may use the program listings information to display program listings and program information for television programming, for on-demand media programming, and for PVR programming. An interactive television program guide application or other suitable application may be used to display such information on a display device that is part of user equipment 160.

Communications network 170 may provide a communications hub between the elements in network topology 100. Communications networks 170 may include a number of different networks such as a public switched telephone network, a packet-based network, a wireless network or the Internet.

An on-line program guide may be provided by a server located in remote server network 110, in distribution server 180, or by a server located in any element included in network topology 100. Remote server 110 may include remote storage 190. Remote storage 190 may be used to store software, media content, and data. In some embodiments, remote storage 190 may provide a user interfacing with user equipment 160 with the capability to store, manipulate, and retrieve media content, user-specific data, and any other type of data.

Remote server network 110 may include one or more VOD specialized servers. VOD servers are tailored towards storing, manipulating, and processing images and video. For example, VOD and VOD-related servers have been developed by Concurrent Computer Corporation of Atlanta, Ga., nCUBE of Foster City, Calif., DIVA Systems Corporation of Princeton, N.J., and SeaChange International of Maynard, Mass.

Interactive television applications other than program guide applications may use service providers such as service provider 120. For example, a home shopping service may be supported by a service provider such as service provider 120 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 120 via media distribution facility 150 or via communications network 170.

If desired, applications such as interactive television program guide applications, home shopping applications, home banking applications, and other applications (e.g., applications related to e-mail and chat or other communications functions, etc.) may be provided as separate applications. These separate applications may be accessed through a navigation shell application (e.g., a menu application with menu options corresponding to the applications). Additionally, the features of such applications may be combined. For example, on-demand media, home shopping, and communications functions may be incorporated into the program guide or other application.

These applications or features may be implemented locally on the user equipment. The applications or features may also be implemented using a client-server architecture in which user equipment serves as a client processor, and a server, such as distribution server 180, at media distribution facility 150 or at some other suitable location acts as a server processor. Other distributed architectures may also be used if desired.

Examples of client-server program guides are shown in Ellis et al. U.S. application Ser. No. 09/332,244, filed Jun. 11, 1999, which is hereby incorporated herein in its entirety. Examples of interactive television program guide systems with integrated program listings and video-on-demand display screens are shown in Walker et al. U.S. application Ser. No. 09/829,856, filed Apr. 10, 2001, which is hereby incorporated herein in its entirety. For clarity and brevity, FIG. 1 is illustrated to include only one of each of the elements that are shown therein. However, in implementation, network topology 100 may include more than one of the elements that are shown therein. For example, network topology 100 may include multiple media distribution facilities 150, multiple user-equipment 160, multiple distributions servers 180, etc.

Figure 2:
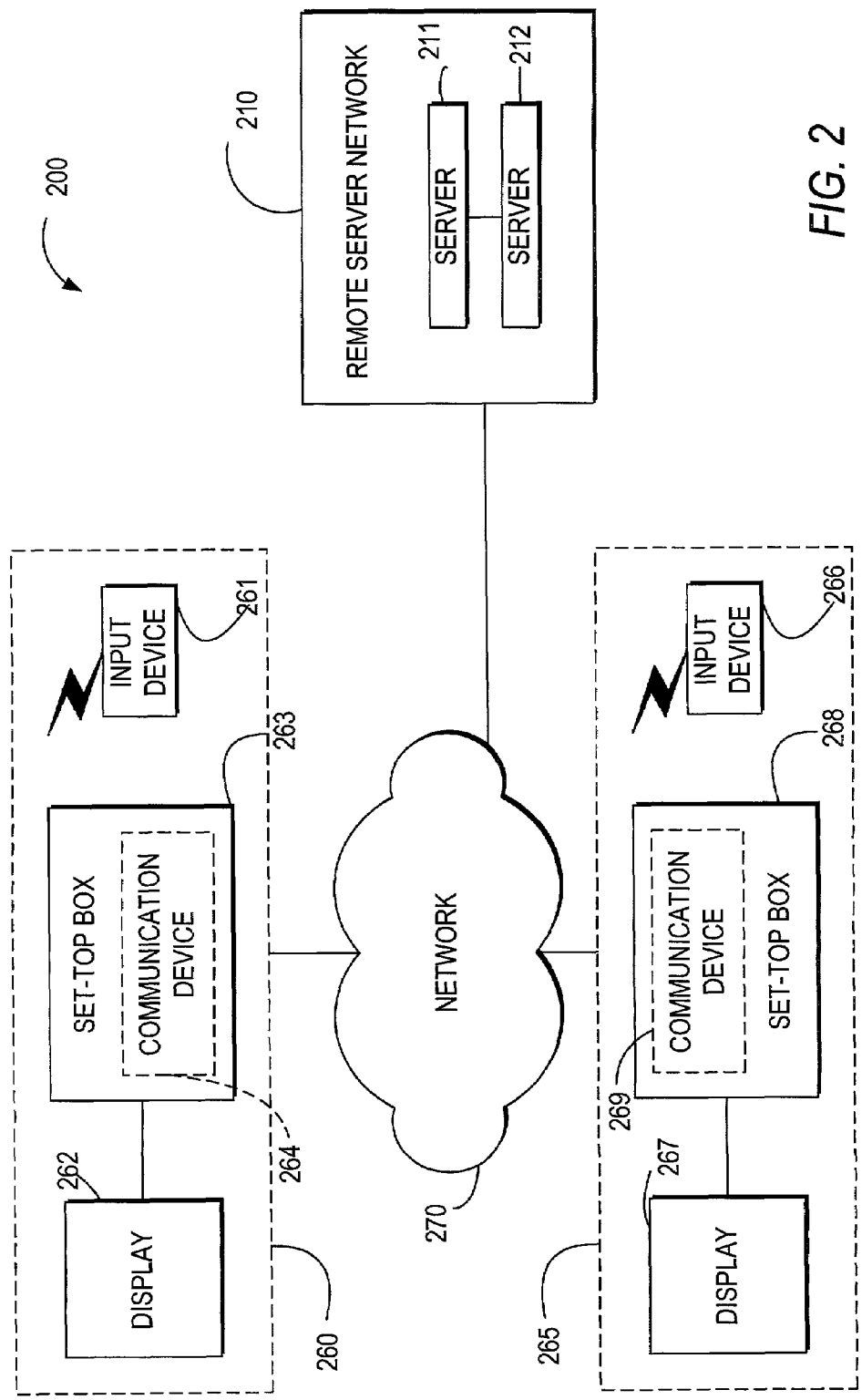
FIG. 2 is a diagram that is illustrative of a network topology of an on-demand media delivery system in accordance with the principles of the present invention.

Turning next to FIG. 2, network topology 200 includes select elements from network topology 100 of FIG. 1 and expands on possible arrangements for such elements.

Network topology 200 may include user equipment 260 and 265, server network 210, and communications network 270. User equipment 260 and 265 are both included in network topology 200 to better illustrate the level of equipment independency that may be obtained in on-demand media delivery systems.

User equipment 260 and 265 may provide a user with the capability to display, retrieve, record, and manipulate user-specific data, on-demand media content, and on-demand media data. User equipment 260 and 265 may be user equipment 160 of FIG. 1. Additionally, user equipment 260 and 265 may include input devices 261 and 266, display devices 262 and 267, set-top boxes 263 and 268, and communication devices 264 and 269 respectively.

Input devices 261 and 266 may allow a user to access, control, or communicate with devices in user equipment 260 and 265 respectively. When used in conjunction with communication devices 264 and 269, a user may communicate with, access, or program certain devices in network topology 200 via communications network 270. Examples of input devices 261 and 266 may include, for example, remote controls, keyboards, voice recognition devices, and control panels located on the devices in user equipment 260 and 265.

Display devices 262 and 267 may provide a medium on which on-demand media content and data may be presented or displayed to a user. Examples of display devices that may generally be used may include, for example, television sets, personal digital assistants (PDA's), computer monitors, and cell phones. Display devices 262 and 267 of FIG. 2 may be television sets, monitors, or other suitable display devices. Display devices 262 and 267 may not be limited to only visual forms of presentation. For example, if desired, on-demand audio content and data may be presented and displayed audibly to the user by display devices 262 and 267. Display devices may also include, for example, speakers, radios, sound-systems, and earphones.

Set-top boxes 263 and 268 may be capable of retrieving and sending on-demand media content and on-demand media data to devices located outside of user equipment 260 and 265 through communication devices 264 and 269. Examples of communication devices 264 and 269 may include, for example, local servers, telephone or cable modems, infrared ports, and wireless LAN access points. Set top boxes 263 and 268 may also contain processing and storage capabilities as well as software needed for an on-demand media delivery system. Examples of software implemented on set-top boxes 263 and 268 may include, for example, interactive television program guide applications.

For clarity and brevity, user equipment 260 and 265 are illustratively shown to include set-top boxes 263 and 268. However, in some embodiments, user equipment systems 260 and 265 may include a personal computer that has sufficient hardware and software capability to perform the functionality described herein or may include other devices with capabilities similar to set-top boxes. If desired, user equipment may include local storage devices such as a VCR, or a digital video recorder that may provide conventional data recording and storage capabilities.

Communications network 270 may provide a communications hub and communications medium for the devices of network topology 200. Persons skilled in the art will appreciate that communications network 270 has been provided in network topology 200 to illustrate the many different ways that the devices of network topology 200 may be connected together. Communications network 270 may represent connections such as direct connections network connections, or combinations of direct and network connections for devices in network topology 200. Communications network 270 may include, for example, routers, switches, wide area networks, the Internet, LANs, intranets, wireless LANs, repeaters, landline networks, PSTN, PABX, cable television systems, etc.

Remote server network 210 may provide a remote location in which on-demand media content and on-demand media data may be stored. Remote server network 210, which may be an on-demand media server, may be configured to store, access, and manipulate user-specific data in addition to the on-demand media content and the on-demand media data. If desired, remote server network 210 may provide a communications hub between user equipment 260 and 265 and other elements in network topology 200. Furthermore, remote server network 210 may be part of a media distribution facility or cable system headend.

Remote server network 210 may also include any number of remote servers 211 and 212. Examples of remote servers 211 and 212 may include virtual servers, routing servers, queuing servers, storage servers, media servers, or any other type of server. Remote server network 210 may include one or more servers.

User equipment platform independent on-demand features may be provided to users for accessing, manipulating, or storing on-demand media content and on-demand media data, and also for accessing, manipulating, or storing user-specific data.

Figure 3:
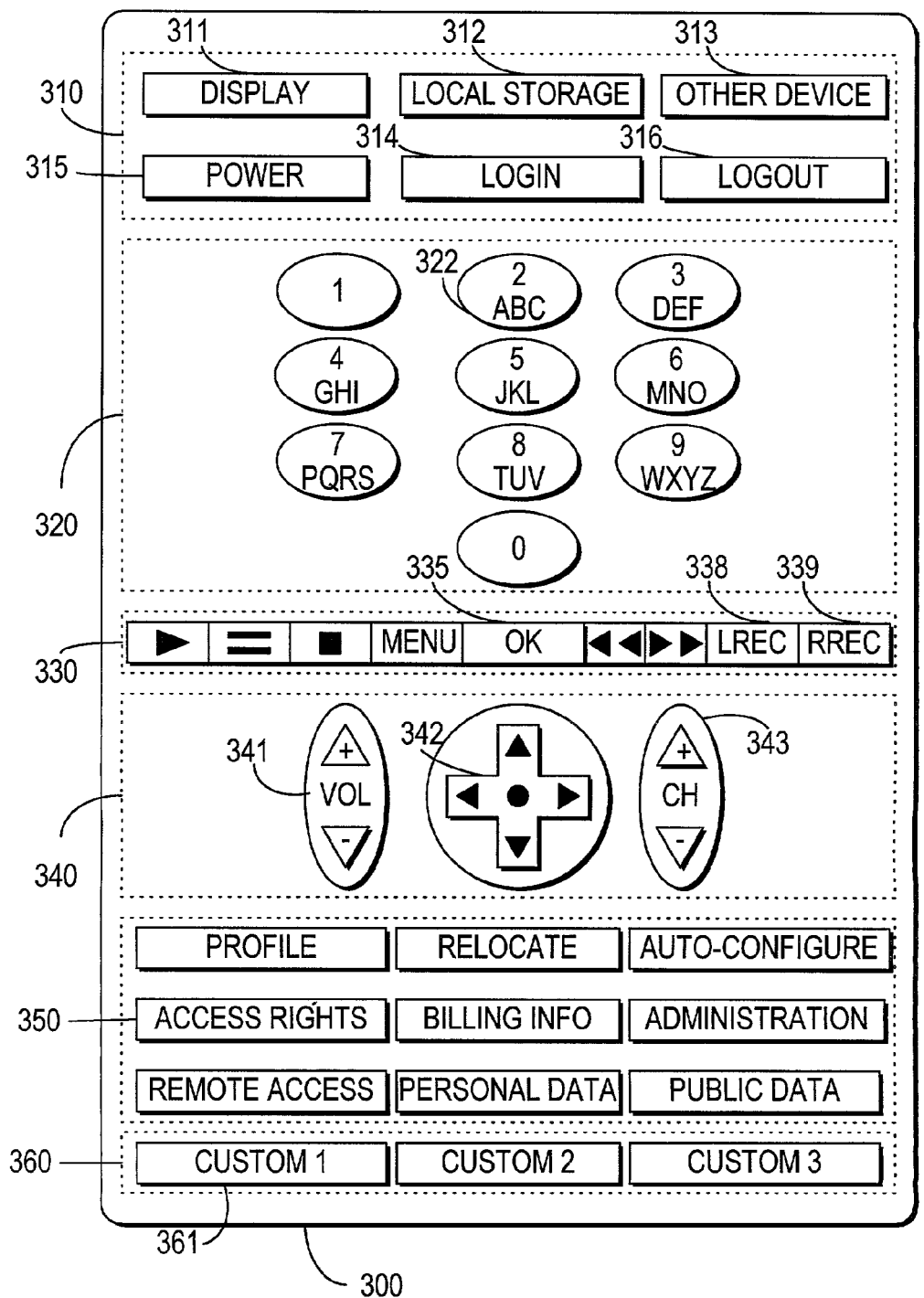
FIG. 3 is a diagram that is illustrative of a remote control for an on-demand media delivery system in accordance with the principles of the present invention.

FIG. 3 shows illustrative remote control 300, which may be used as an input device for user equipment. Remote control 300 may include, for example, primary option buttons 310, alpha-numeric buttons 320, task buttons 330, control buttons 340, secondary option buttons 350, and custom buttons 360. Other arrangements of some or all of the buttons may also be used.

Primary buttons 310 provide a user with access to frequently used actions in an on-demand media delivery system. Primary buttons 310 may include display button 311, local storage button 312, other device button 313, power button 314, login button 315, and logout button 316. Display button 311, local storage button 312, and other device button 313 may be used to identify the device with which the user seeks to interact. Login and logout buttons 315 and 316 may allow a user to communicate his or her identification to the on-demand media system. This identification may be communicated through alpha-numeric buttons 320.

Alpha-numeric buttons 320 may be used to enter, for example, numbers, letters, or an alpha-numeric string. Alpha-numeric buttons 320 may be used in conjunction with other buttons of remote control 300. For example, if login button 315 is pressed, alpha-numeric buttons 320 may be used for alpha-numeric entry of identification information.

Task buttons 330 may provide means for directing a task to be performed by a device in the on-demand media delivery system. For example, "LREC" button 338 may be used to have a local VCR record media content that is currently being displayed by the user equipment. If "RREC" button 339 is used, currently displayed media content may be recorded on a server in a remote server network. Task buttons 330 may include, for example, play, pause, record, stop, menu, confirm, rewind, fast-forward, local record, and remote record buttons or any other task button.

Control buttons 340 may include volume control buttons 341, navigation buttons 342, and channel control buttons 343. Navigation buttons 342 may be used to adjust or move a desired element (e.g., a cursor, a highlight window, etc.) either vertically, horizontally, or both. For example, if the desired element is a cursor on an interactive program guide display screen, navigation buttons 342 may be used to move the cursor in the display screen. The "OK" key in task buttons 330 may be used in combination with navigation buttons 342 to select on-screen options.

Secondary buttons grouping 350 may include, for example, profile access, relocate, auto-configure, access rights, billing information, administration, remote access, personal data, and public data buttons. Some of these features are further discussed below.

Custom buttons grouping 360 may include buttons associated with any actions or commands that are pre-defined by a user. If desired, other keys and options may be included on remote control 300. Functions shown on remote control 300 of FIG. 3 may alternatively be offered as on-screen options or using other input means (e.g., voice input).

Figure 4A:
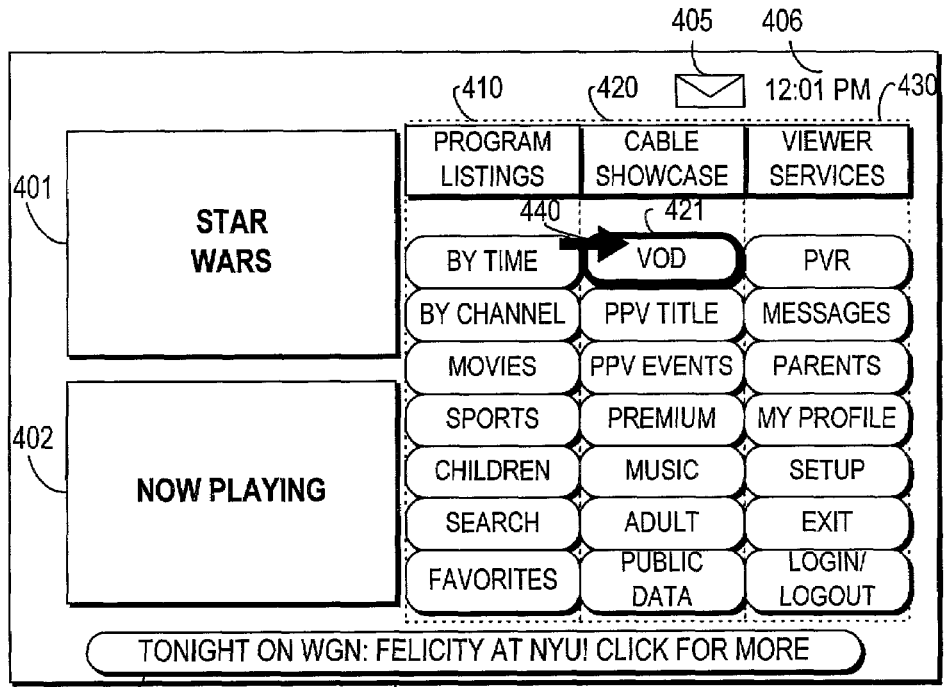
FIG. 4A is a diagram that is illustrative of a navigation display screen in accordance with the principles of the present invention.

FIG. 4A shows illustrative navigation display screen 400 that may be used as a top-level display screen for an on-demand media delivery system in accordance with the principles of the present invention. Navigation display screen 400 includes media windows 401 and 402, mail prompt 405, time label 406, quick fact button 408, program listing options 410, cable showcase options 420, and viewer services options 430.

Media windows 401 and 402 may be used to display user-selected media content, system-selected media content, interactive advertisements, or other content displayed through user equipment. Media windows 401 and 402 may be removed, relocated, or resized in display screen 400.

Mail prompt 405 may be displayed to indicate new messages or selected by a user to read electronic mail or to prepare and send electronic mail. Time label 406 may be used on display screen 400 to display the current time to a user. Time label 406 may be tailored by the user to also display other time critical information. Quick fact button 408 may display a fact of possible interest (e.g., an interactive advertisement) in display screen 400. Quick fact button 408 may be selected to take further action or to display a related display screen.

Program listing options 410 may include options for viewing program listings by time, by channel, or by genre (e.g., sports, children, etc.). Program listings options 410 may also include an option for searching for programs of interest (e.g., using keywords, based on a title search, based on an actor search, etc.). Program listings options 410 may include an option to view a user's favorite program listings.

Cable showcase options 420 may include options for accessing video-on-demand program listings, pay-per-view program listings, pay-per-view event listings, premium program listings, music program listings, or adult program listings.

A highlight window or cursor may be used to move within a display screen. For example, cursor 440 may be used to select options in display screen 400. Remote control 300 (FIG. 3), particularly navigation buttons 342 (FIG. 3), may be used for moving cursor 440 within display screen 400. The area upon which cursor 440 is positioned over may be selected by pressing a select, enter, or OK key, such as remote control button 335 of FIG. 3.

Screen 400 may also contain viewer services options 430. Suitable viewer services options 430 may include, for example, an option to access features and/or information from a personal video recorder, an option to access messages (either e-mail messages or messages provided from a television system service provider), an option to adjust parental control settings (e.g., blocked channels or ratings, etc.), an option to set or view profile data (e.g., favorite channels, etc.), an option to set up the program guide or user equipment, an option to exit display screen 400, and an option to login to the system.

For brevity and clarity, programming and other media that is available for viewing, but is without a scheduled air time is primarily discussed in the context of video-on-demand programming.

Figure 4B:
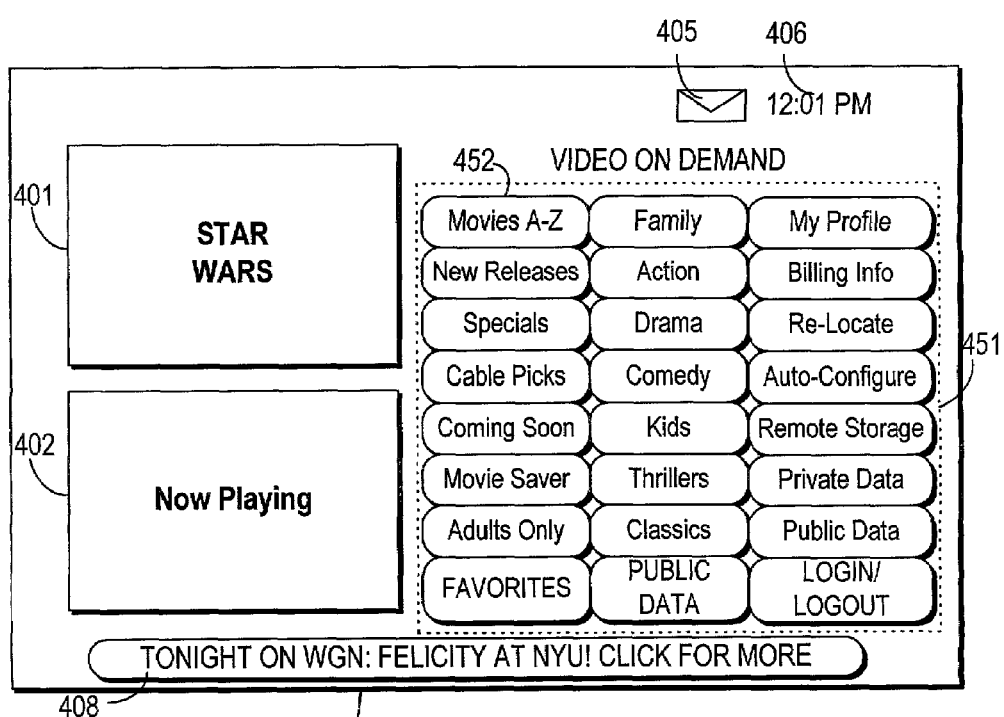
FIG. 4B is a diagram that is illustrative of a video on demand directory display screen in accordance with the principles of the present invention.

If the user selects video-on-demand (VOD) option 421, the program guide may present the user with a screen such as video-on-demand display screen 450 of FIG. 4B. Display screen 450 may contain various options that allow the user to view video-on-demand program listings organized by different criteria such as genres (e.g., family, action, drama, comedy, kids, thrillers, classics, etc.). If the user selects movies A-Z button 452 of display screen 400, the program guide may present display screen 500 of FIG. 5A in which video-on-demand program listings are listed alphabetically.

Active area 507 may be present in many different display screens. Active area 507 may be an interactive advertisement. Illustrative ordering display screen 550 of FIG. 5B may be displayed when a user selects a VOD listing such as a listing for Star Wars from display screen region 540 of FIG. 5A or from active area 507 of FIG. 5A. Video-on-demand ordering display screen 550 may be displayed through any other suitable technique.

Display screen 550 may contain information region 552 that includes information on the title, purchase price, running time, rating, and other information related to the user's selection. A detailed information region such as information region 551 may also be displayed. Region 551 may include a detailed description of the VOD listing, information on the actors in the movie, the running time, the year of release, etc.

Figure 5A:
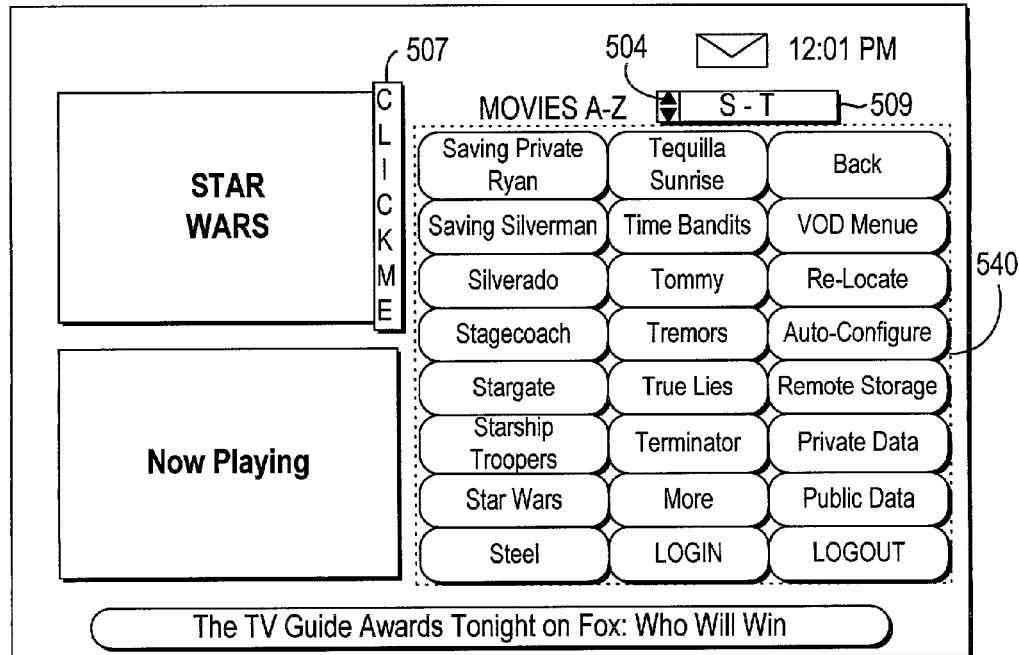
FIG. 5A is a diagram that is illustrative of a movie listings display screen in accordance with the principles of the present invention.
Figure 5B:
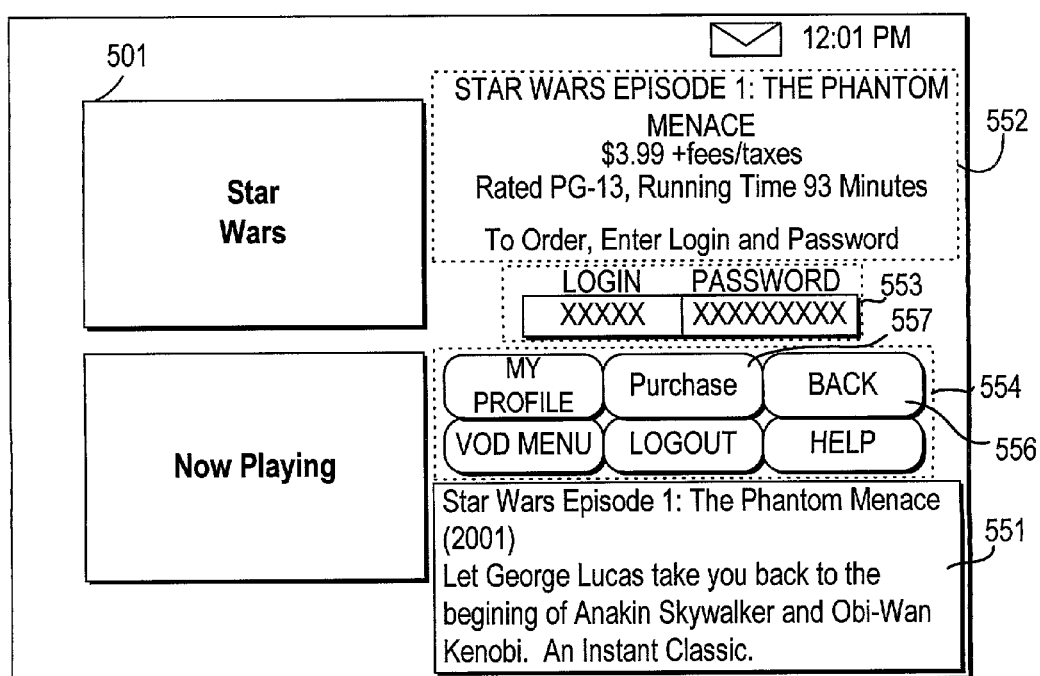
FIG. 5B is a diagram that is illustrative of a movie ordering display screen in accordance with the principles of the present invention.

If the user selects back option 556, the user may be taken back to display screen 500 of FIG. 5A. If the user desires to purchase the video-on-demand program, the user may use remote control 300 of FIG. 3 to enter the user's login identification and associated password information. Other user identification techniques may also be used. These identification structures may support the entry, for example, of a purchase code or personal identification number (PIN) in region 553.

Figure 6A:
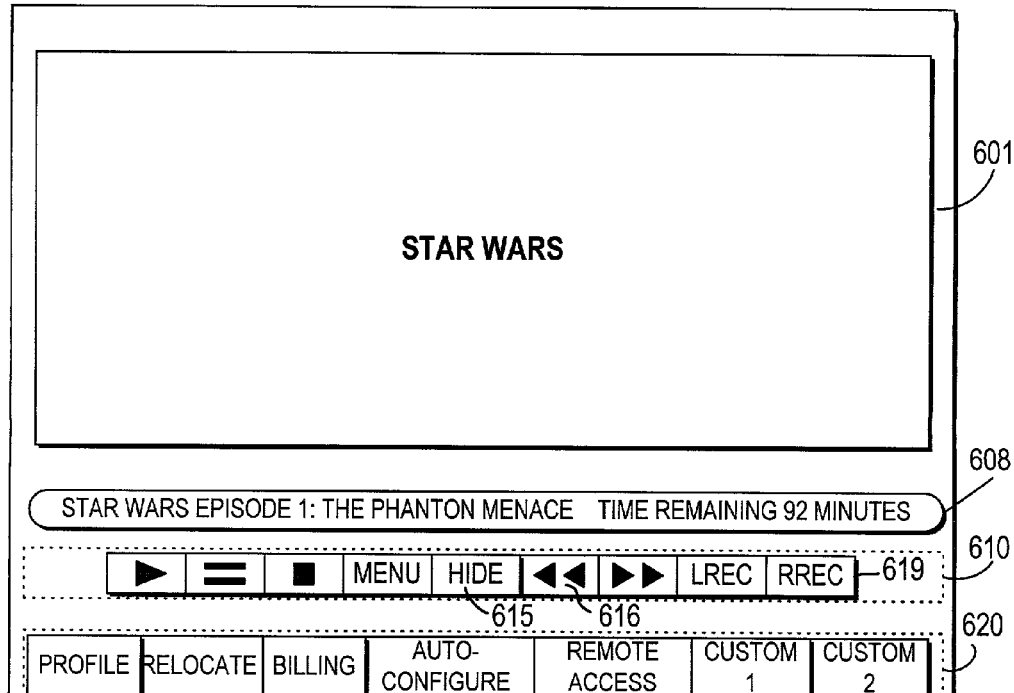
FIG. 6A is a diagram that is illustrative of a movie remote-control display screen in accordance with the principles of the present invention.

When valid login information is entered and a purchase button is selected (e.g., button 557), the distribution of the selected video-on-demand program may be authorized to the user from server 180 or remote server network 110 of FIG. 1 or other suitable distribution source to the user who is currently logged into the system. The requested video-on-demand program may be displayed in display screen 600 of FIG. 6A.

Region 608 may be displayed in display screen 600 and may contain information on the program title and the time remaining in the current video-on-demand program. Region 608 may also contain a selectable advertisement. Region 608 may be provided as an overlay over the video-on-demand program that is being presented, as an L-shaped frame region surrounding a reduced-size video window, or in any other suitable configuration or layout. Region 608 may be invoked whenever a user presses an appropriate key on remote control 300 of FIG. 3 and may be removed, for example, after a specified period of inactivity.

Primary on-screen control options 610 may be included in display screen 600 to give users one way of controlling the on-demand media content being displayed in window 601. Primary control options 610 may be selected by the user, for example, to play, pause, stop, rewind, record locally, record remotely, or fast-forward the video-on-demand program. Hide option 615 may also be included in control options 610. When selected, hide option 615 may remove all elements other than window 601 from display screen 600.

When the user selects a control command, the program guide may direct server 180 of FIG. 1, a server located in remote server 110, or other suitable equipment to perform the requested function. For example, when the user selects the remote record option 619, the program guide may direct the server in remote server network 110 to record the video-on-demand program on the relevant storage space 190. When the user selects record option 619, the server may record some or all of the video-on-demand program that is currently available to the user. These are merely illustrative examples and any suitable technique for handling video-on-demand recordings may be used if desired.

If the user selects rewind option 616, the program guide may direct the appropriate device, such as server 180 of FIG. 1, to skip to an earlier portion of the video-on-demand program. A real-time rewind process may be used in which the video-on-demand programming is displayed during the rewind operation. Commands for pausing, playing and fast-forwarding may be handled similarly.

Figure 6B:
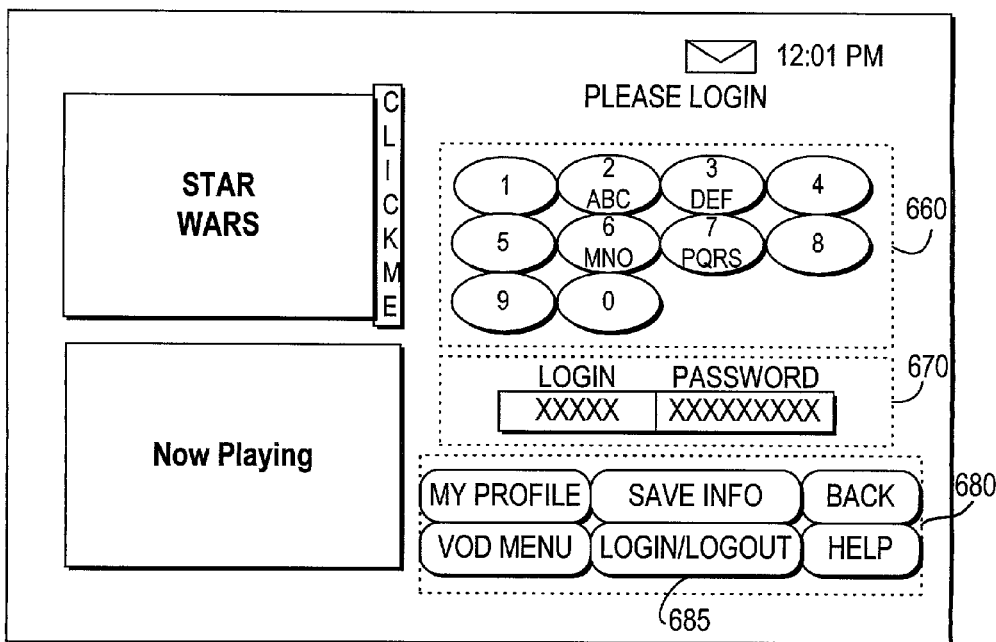
FIG. 6B is a diagram that is illustrative of a login display screen in accordance with the principles of the present invention.

FIG. 6B shows illustrative primary login display screen 650. Login display screen 650 may include an enter identification region 670 in which user identification may be entered by a user (e.g., using alpha-numeric keypad 660). Additionally, options region 680 may be included in display screen 650. Options region 680 may include options that are be used to access, for example, a user's profile, a prior display screen, help information, a VOD menu, and/or login/logout options. Once an appropriate identification information is entered into identification region 670, a user may use login/logout button 685 to send the user's identification information to remote server network 110 or any other suitable device in network topology 100 of FIG. 1. Other techniques for login may also be used. For example, if a user has already been identified by the user, the system may not be required to submit further information.

A relocate feature may be included in the on-demand media system. This relocate feature may allow a user to freeze media-on demand content being presented on one user equipment and switch to some other user equipment to resume the presentation of the media on-demand content (i.e., resume from the point at which the user had frozen the content). The user equipment may be equipment such as user equipment 260 and 265 of FIG. 2. If the user wants to continue watching the on-demand media content at a friends house (e.g., user equipment system 265 of FIG. 2), the user may only have to use the relocate feature to freeze the on-demand media content and relocate to the friend's house to resume the on-demand media content.

Figure 7A:
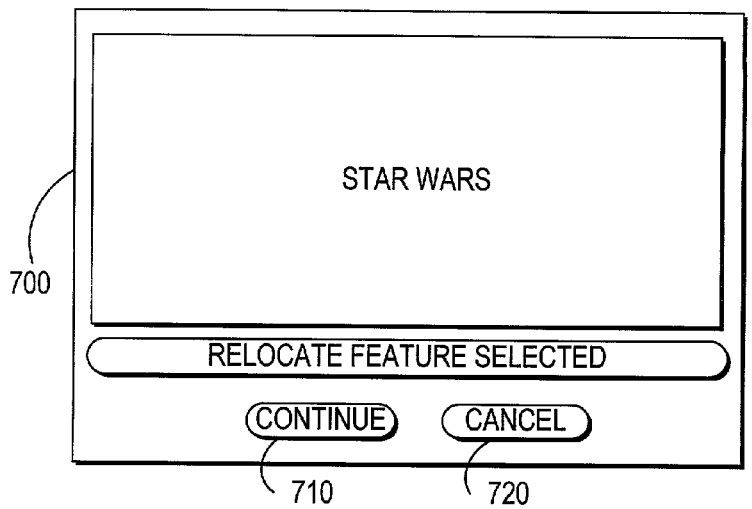
FIG. 7A is a diagram that is illustrative of a relocate confirmation display screen in accordance with the principles of the present invention.

FIG. 7A shows an illustrative relocate feature confirmation display screen 700. Display screen 700 may be displayed when a command from remote control 300 of FIG. 3 is selected or when an appropriate option on an on-demand media display screen is selected to indicate a user's interest to freeze the program. If a user wants to confirm a freeze request, option 710 may be selected. If a user does not want to confirm the freeze request, option 720 may be selected. If desired, a user may freeze a VOD program by simply selecting the relocate feature from a remote control or from an earlier on-screen menu. If the user has not previously logged in or otherwise been identified, the user may be asked to log in or to provide identification information when making a freeze request.

Figure 7B:
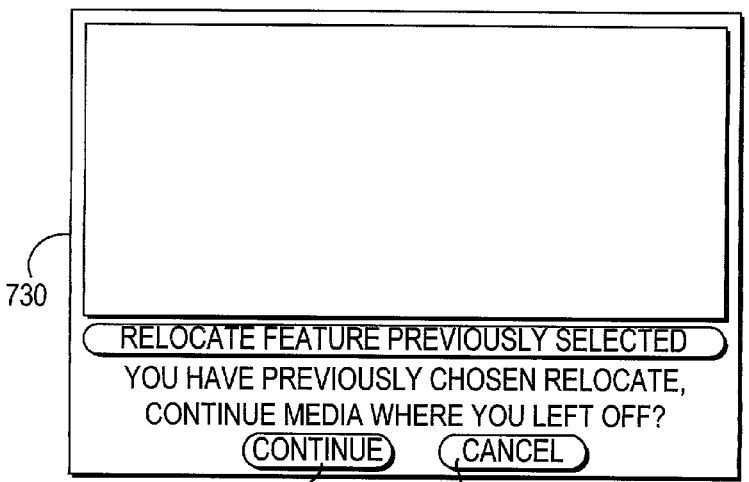
FIG. 7B is a diagram that is illustrative of a continue after relocate display screen in accordance with the principles of the present invention.

FIG. 7B shows illustrative relocation display screen 730 that may be displayed when a command from remote control 300 of FIG. 3 is selected or when an appropriate option on an on-demand media display screen is selected to resume on-demand media that was frozen earlier by the user. Option 740 may be selected if a user wants to start to view the media from the frozen point on user equipment that is different (e.g., different household, different subscriber site, different room, different equipment platform, etc.) than that which was used to freeze the media.

When a user selects continue option 740, the media may be presented on the current user equipment starting from the frozen point. If desired, media may be queued to the frozen point for presentation to a user when a user who had previously selected a freeze (or relocated) option logs into the system. Also, if desired, the media may be queued selectively upon user request (e.g., user selects a resume from frozen point option). If the user has not previously logged in or otherwise been identified, the user may be asked to log in or asked to provide identification information when making a resume request. The system may also allow the user to select from multiple programs which may have been previously frozen by the user.

When the relocate feature is first selected by a user, remote server network 110 of FIG. 1 may, for example, pause the on-demand media content being viewed by the user and store a content location reference to an appropriate user-specific account. After the user switches to a different location and requests that the paused content be appropriately delivered, remote server network 110 may retrieve the appropriate content location reference and continue delivering the media content from the point at which the user paused the content. Before the media content may be delivered, the remote server network may require that the user be identified so that the appropriate user-specific data and/or a user-specific account information, may be located and accessed.

User-specific data or account information may be stored in a section of remote server network 110 (FIG. 1) dedicated to the user. Remote server network 110 (FIG. 1) may be a VOD server that is configured to store such information and data. An account on remote server network 110 (FIG. 1) may also be used to store that user's personal images or video. Remote server network (FIG. 1) may allow users to access their personal images or videos from their own home or from user equipment at other locations.

Figure 7C:
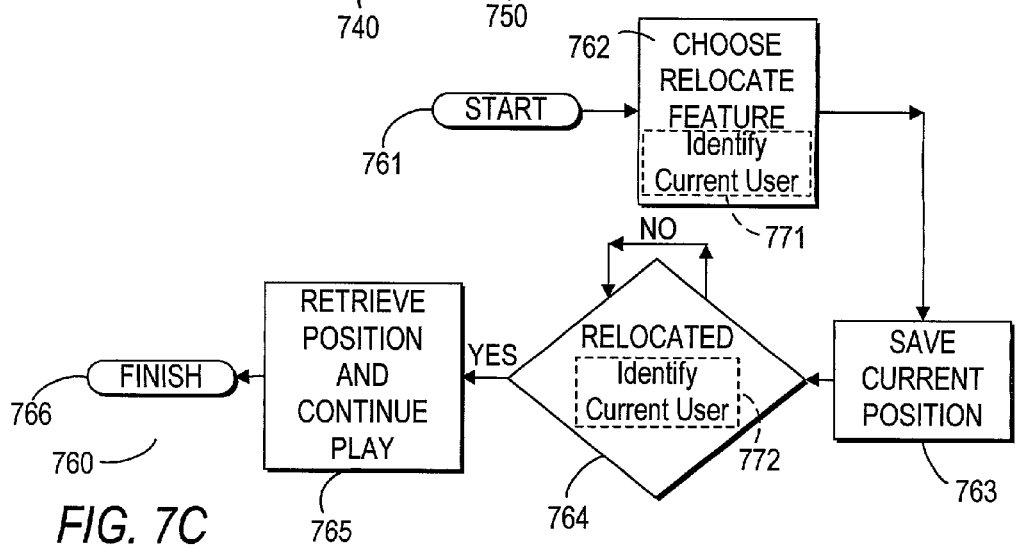
FIG. 7C is a flow chart that is illustrative of a relocation process in accordance with the principles of the present invention.

FIG. 7C is a flow chart of illustrative relocation process 760 that shows how data is stored and accessed when a relocate feature is selected. Process 760 begins with start step 761 that may include almost any interaction with the media-delivery system that results in the relocation feature being presented to the user. Start step 761 may, for example, be a user interaction that brings up relocate display screen 700 of FIG. 7A. At step 762, a user may be given an opportunity to choose or confirm the relocate feature.

If desired, step 762 may include step 771 for identifying a current user (e.g., identifying a current user on a first user equipment). User identification step 771 may provide the user with the ability to log into the on-demand media system, which may include prompting the user for an identification and/or password. Step 771 may be performed, for example, in response to a user selecting the relocate feature.

If desired, step 771 may be part of start step 761 to allow the system to identify the current user before the relocate feature is selected by the user.

The on-demand media system may then save the user's current position (step 763) when the user selects the relocate feature. Saving the current position may involve, for example, saving a pointer that identifies where the media content was 'frozen' or paused by the relocate feature. If the user was identified in step 771, process 760 may store any data relevant to the operation of the relocate feature in storage space associated with the user. If desired, saving the current position may involve recording the media content from the point at which the relocate feature was chosen. At step 764, process 760 may enter an idle mode until a user selects to resume reception. Step 764 may include step 772 for identifying the current user (e.g., identifying a current user on a second user equipment). Step 772 may be performed when a user selects to resume media using the relocate feature. At step 772, the system may provide a current user with the ability to log into the on-demand media system, which may include prompting the user for an identification and/or password. If desired, step 772 may be performed before the current user selects to resume media using the relocate feature.

At step 765, the location of the media content that was being viewed when the relocate feature was initially selected may be retrieved. If the user was identified in step 772, data associated with the operation of the relocate feature may be retrieved from storage space associated with the current user.

If a pointer was stored, the system may find the correct location of content in the on-demand media delivery system using the pointer and continue playing the media from that point (Step 765). If desired, the media may have been remotely recorded from the point at which the relocate future was selected. In such embodiments, the system will simply begin playing content from the point at which the content was recorded. After the content has been successfully retrieved and resumed, finish step 766 may occur which may denote the end of process 760.

Figure 8:
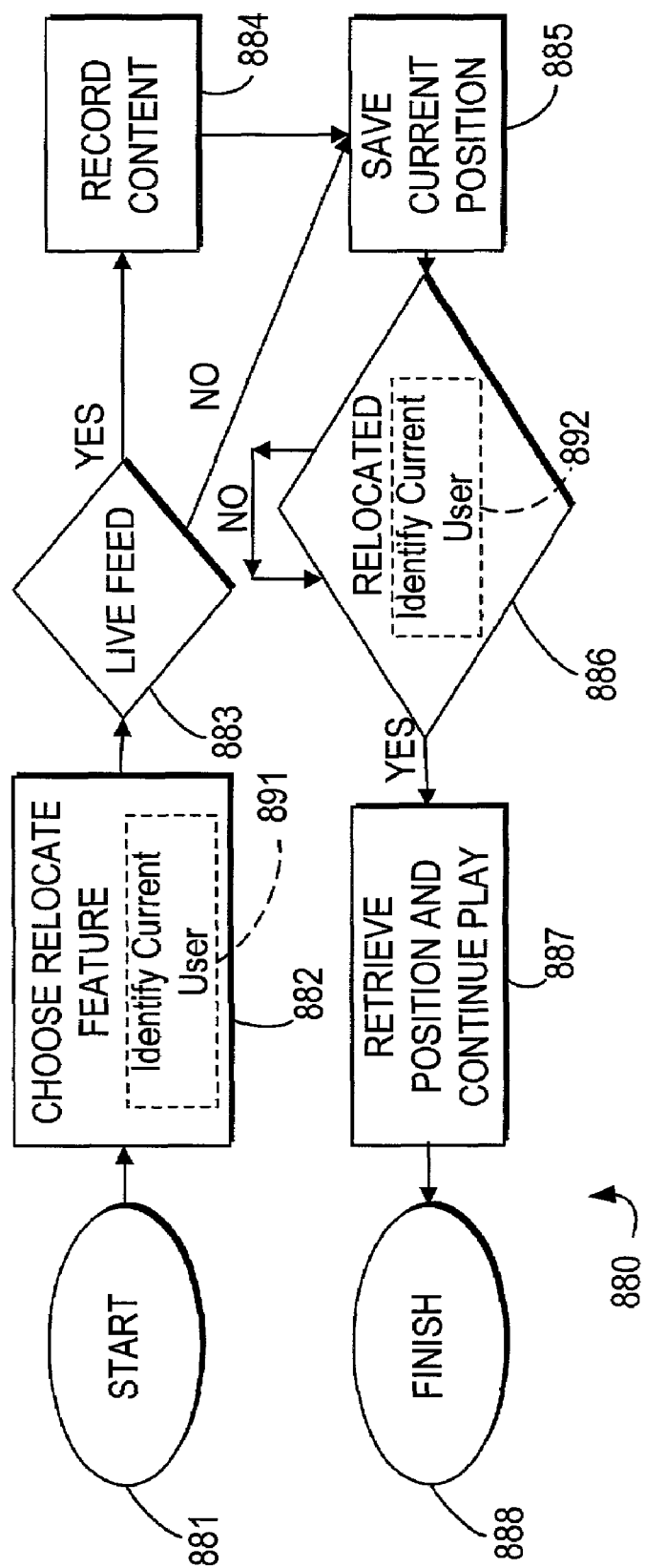
FIG. 8 is a flow chart illustrative of a relocation process that includes a live content feed option in accordance with the principles of the present invention.

FIG. 8 illustrates relocation process 880 and is similar to process 760, but includes the possibility of relocating while watching live content. Steps 881, 882, 891, 886, 892, and 888 are essentially the same as steps 761, 762, 771, 764, 772, and 766 of FIG. 7C, respectively. At live feed check step 883, the system may determine if the current media is a live feed. If the media is not a live feed, step 885 is performed, which involves storing the current position of the media. If the media is a live feed, the media may be remotely recorded at step 884. After step 884 occurs, the position of the media may be stored at step 885. If desired, the position of the media may be stored in the form of a pointer. During step 886, the system may be in an idle state, waiting for the user to indicate that the user has relocated to new user equipment. If desired, process 880 may include steps 891 and 892 at particular points in process 880 as shown and/or discussed above in connection with steps 771 and 772 of FIG. 7C for identifying a current user at a first user equipment and at a second user equipment when a user has relocated to the second user equipment. After a user has relocated, the system may, in step 887, determine the stored media position, retrieve the stored media position, and then continue playing the media from the stored media position. Once play commences, finish step 888 is reached and the user is successfully relocated.

A remote on-demand media server may be configured to store and deliver user-specific media (e.g., pictures, videocam recordings, etc.), or user-uploaded data or media. Access to such data and media may be controlled in a variety of ways.

Figure 9:
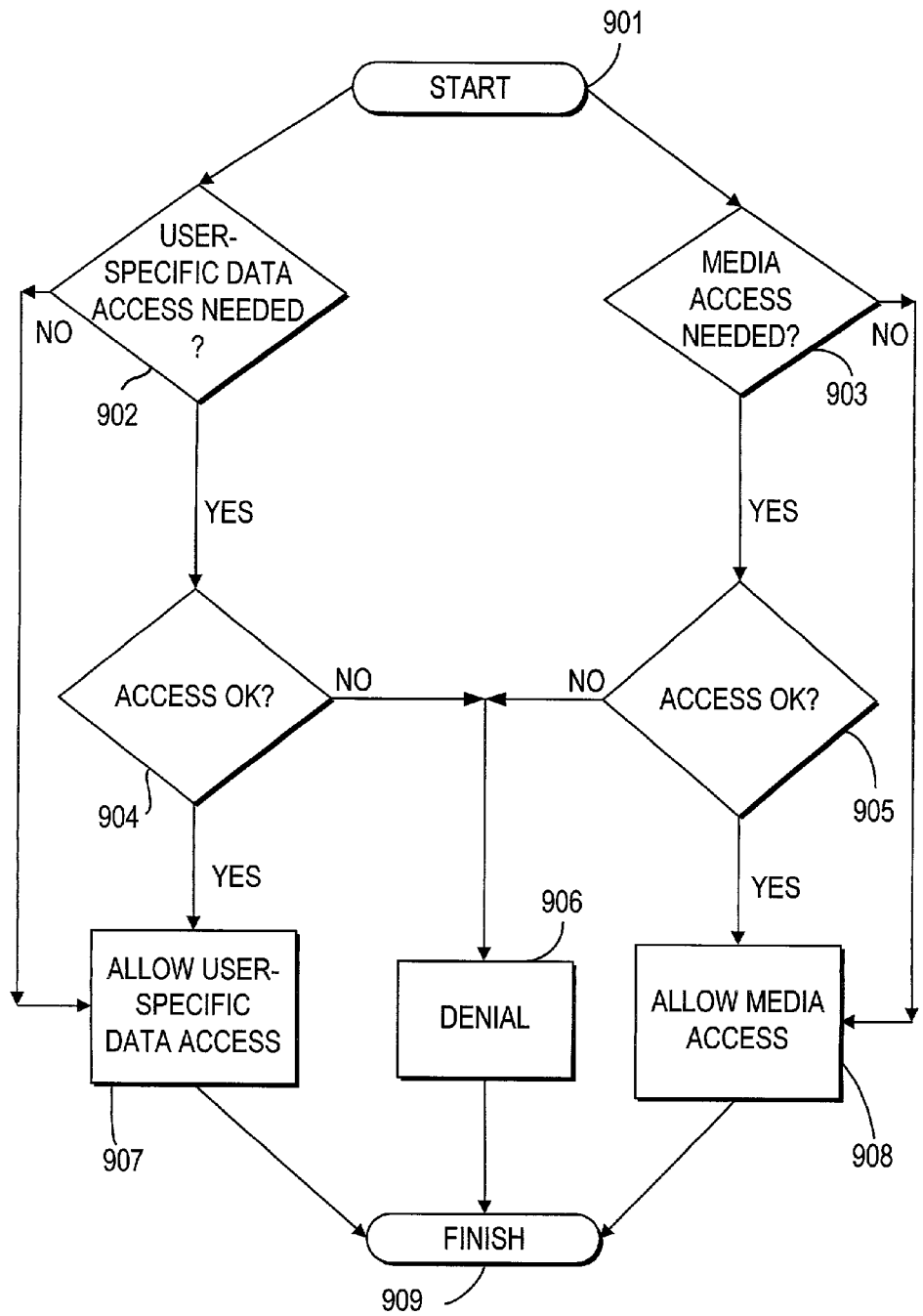
FIG. 9 is a flow chart that is illustrative of a data and media access process in accordance with the principles of the present invention.

FIG. 9 shows illustrative data and media access process 900 for remote servers. At step 901, a static request from the on-demand media system or a manual request from a user interfacing with user equipment may be received. The request may be associated with the retrieval of media content or user-specific data.

To retrieve media content, server 180 of FIG. 1 may be accessed. At step 902, in response to a request for user-specific data, the appropriate device in network topology 100 of FIG. 1 may be checked to determine if any type of authorization is needed to access the requested data. At step 903, in response to a request for media content, the system may check appropriate devices in network topology 100 of FIG. 1 to determine if any type of authorization to access the requested media content is needed.

If access to the data or media does not need any type of authorization, the data or media may be retrieved and the user may be provided with an opportunity to access the data or the media at steps 907 and 908. Data or media that may not require access privileges may include, for example, data or media defined by a user as public.

If authorization is needed, then at step 904 or at step 905, a request may be sent to determine if the user has permission to access the desired data or media. Steps 904 and 905 may include asking the user for an account identity and/or password. At step 906, users may be denied access when the users have not been given access rights for the desired data or media. If a user does have permission to access the desired data or media, the user may be given access to the data at step 907 or access to the media at step 908.

If desired, steps 902 and 903 may be combined. If desired, steps 904 and 905 may be combined. Also if desired, 907 and 908 may be combined.

As mentioned above, the on-demand media system realizes many unique features in utilizing the capabilities of remote storage and remote access. Some of such unique features may be realized in connection with remotely stored user profiles or remotely stored user accounts.

An on-demand media delivery system may have an account for a user or a group of users (e.g., a household)that may be used to store user profiles for users associated with the account. A user profile may act as a governing data structure through which user-specific data and on-demand media content and data may be accessed, stored, and retrieved.

Remote server network 110 of FIG. 1 may be partitioned and formatted to include a user account for any user or group of users in which account-specific data and on-demand media content may be stored, manipulated, and accessed.

Figure 10:
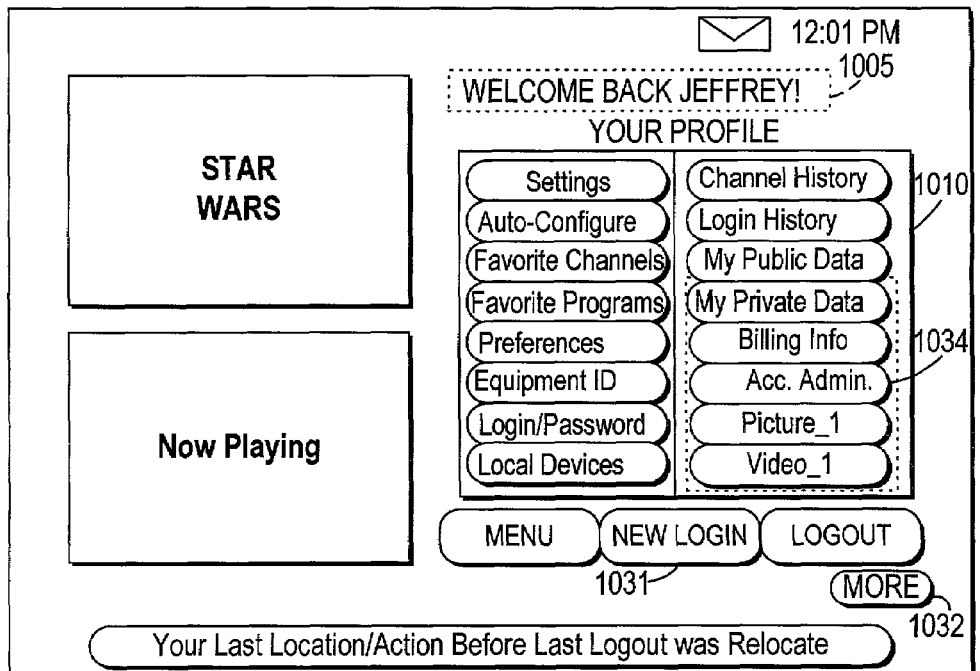
FIG. 10 is a diagram that is illustrative of a profile display screen in accordance with the principles of the present invention.

FIG. 10 shows illustrative profile display screen 1000 that may include user identification information 1005 to show who is currently recognized by the system. If a new user wishes to login, new login option 1031 may be selected and a login display screen such as display screen 650 of FIG. 6B may be initiated. If the user desires an option that is not present on display screen 1100, more options button 1032 may be selected.

Region 1010 includes a number of different user-selectable options such as a preferences option as shown. These options may allow the user to access or use locally or remotely stored data or media when the user is logged into the system.

Figure 11:
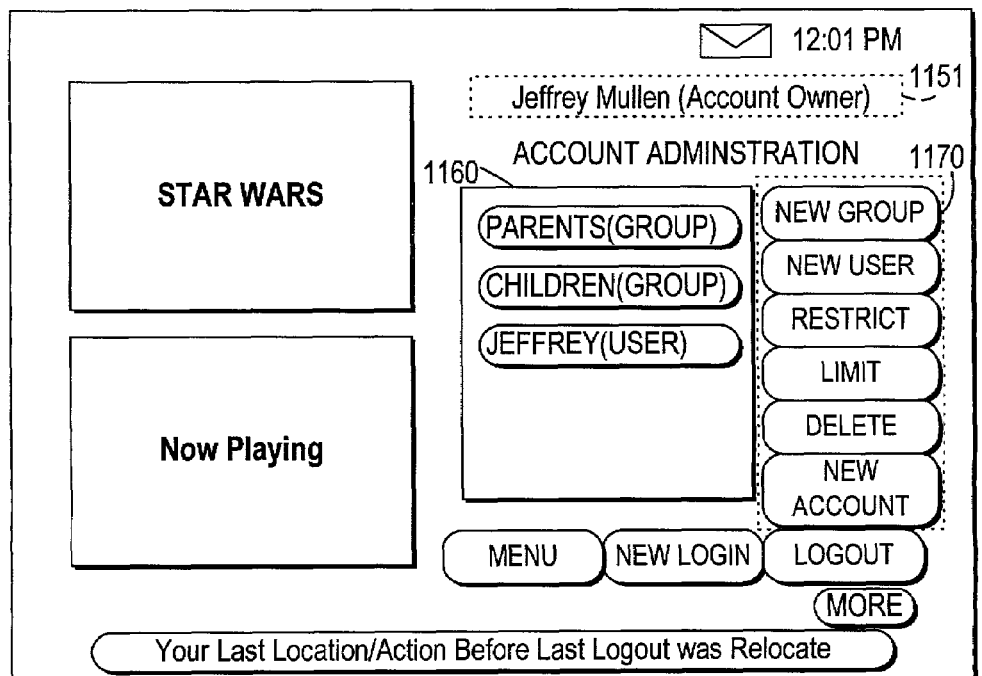
FIG. 11 is a diagram that is illustrative of an account administration display screen in accordance with the principles of the present invention.

FIG. 11 shows illustrative account administration display screen 1150 that may be displayed when account administration option 1034 of FIG. 10 is selected. Account information 1151 may be displayed on display screen 1150 to show which user is currently recognized and to identify the administrative position of that user. Account administration window 1160 may be located on display screen 1150 and may contain a list of users or groups that are under the recognized user's account. The recognized user may change the properties of the users or groups in window 1160 through administrative controls 1170. A user may change properties of a user or a group by first selecting a user or group from window 1160 (e.g., pressing a data entry key when a highlighted window is positioned over a user or group) and next positioning a cursor or highlight window on one of the options in controls 1170 to take desired action. Examples of controls that may be included in administrative controls 1170 may include, for example, add new group, add new user, restrict group, restrict user, limit group, limit user, delete group, delete user, create a new account for a user, and create a new account for a group.

Storing user-specific data such as the user's preferences (e.g., preferences in general, preferences for on-demand media, etc.) in a remote server such as a VOD server may allow for a personal auto-configure feature that would follow a user to move from equipment to equipment. This feature may allow preferences to be retrieved and executed by user equipment after the user has been identified by the system (e.g., identified by a remote server network). Some categories of preferences and user-specific information that may be used in an auto-configure feature may include, for example, volume settings, favorite channels, reminders, information about user-recorded on-demand media content, the user's last activity, auto-record times, as well as any other preference or activity. For example, after a user is verified by a remote server network, the user equipment may selectively or automatically be configured to match or use some or all of the user's remotely stored preferences.

Figures 12, 13:
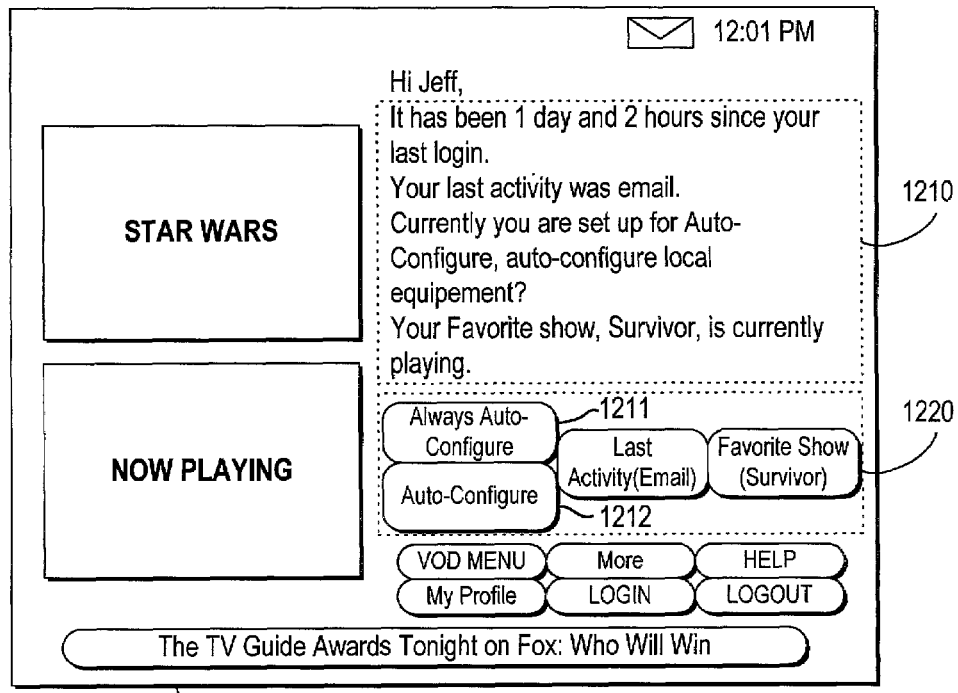
FIG. 12 is a diagram that is illustrative of an auto-configure display screen in accordance with the principles of the present invention.
FIG. 13 is a flow chart illustrative of an auto-configure process in accordance with the principles of the present invention.

FIG. 12 shows illustrative auto-configure display screen 1200, which may be initiated after a user has logged in via a login display screen (e.g., display screen 650 of FIG. 6B). Display screen 1200 may allow a user to select have user equipment auto configured. The user equipment may be user equipment that is currently being used that user. The user equipment may be auto-configured by downloading user-related data and information and processing the data and information on the user equipment to suit the current user.

Information region 1210 may be present on display screen 1200 and may include data from a user's profile or data related to a user's login. Configure options 1220 may be included on display screen 1200. Information stored in a user's profile may be accessed to perform a number of activities when one of options 1220 are selected. The options displayed among in configure options 1220 may vary depending on types of the information that are stored in a particular user's profile. Examples of configuration options 1220 may include, for example, auto-configuration options, last activity options, favorite show option, last show option, and favorite activity option.

Always auto-configure option 1211 may be selected by a user to automatically configured user equipment with the user's personal information whenever the user logs into the system. Auto-configure option 1212 may be displayed when always auto configure option 1211 was not previously selected by the user. Auto-configure option 1212 may be selected to auto-configure the currently used user equipment. User equipment settings may be deleted or reset by the user equipment settings by after a user has logged off and is no longer recognized to be the user equipment.

FIG. 13 shows illustrative process 1350 that may be involved in automatically configuring user equipment. The process may begin at start step 1351, when, for example, an on-demand media delivery system is activated. A user may be allowed to log into the system at step 1352. At step 1353, the user's login information may be verified. At step 1354, if the login information that is entered is valid, the system may check to see if the account of the logged in user indicates that the always auto-configure feature is selected. If the account shows the always auto-configure feature to be selected, the user equipment that was used for logging into the system may be automatically configured with that user's preference information at step 1358.

At step 1358, auto-configuration preferences and information may be retrieved and downloaded to the currently-used user equipment and the user equipment may be configured based on the preferences and information.

If the option to always auto-configure was not selected, a user may be provided with an opportunity to have the currently-used user equipment automatically configured for the current login at step 1355. Step 1358 may be performed when the user selects the auto-configure option during the current login. At finish step 1359, a user may be allowed to resume other activity. In this technique, some or all of a user's profile or preferences may be stored at a remote server.

Figure 14A:
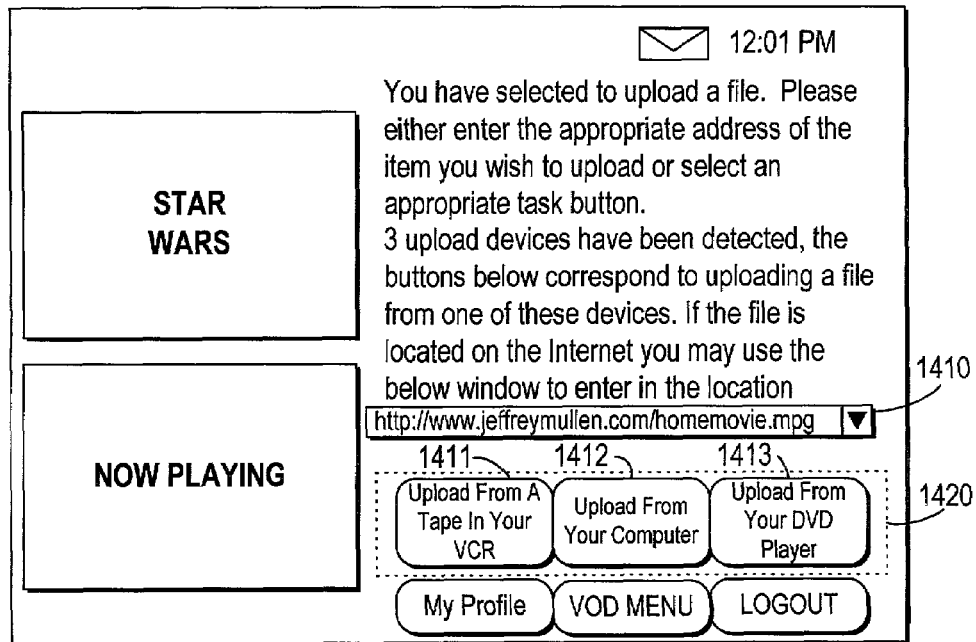
FIG. 14A is a diagram that is illustrative of an upload file display screen in accordance with the principles of the present invention.

The on-demand media delivery system may also contain an upload feature. FIG. 14A depicts an illustrative upload file display screen 1400 which may be initiated in order to upload a file. If desired, the upload feature may include a process that automatically scans user equipment for upload devices.

Upload device buttons 1420 may be displayed on display screen 1400 when different file sources are available. For example, display screen 1400 may include VCR upload button 1411, computer upload button 1412, and DVD player upload button 1413. A user may be allowed to select a button from buttons 1420 to upload data from the device associated with that button.

The upload feature may also include an Internet address entry box 1410. A user may type or select a file address in box 1410. The on-demand media system may search the Internet for a file based on the file address and may upload the file. A user may select practically any file to upload when the file is found and have the file stored on a remote server of the on-demand media system.

Files uploaded to the remote server (e.g., VOD server) may also be downloaded to user equipment to be presented to a user. Files may be transferred from one user equipment to a different user equipment system through a media-on-demand remote server. Files may include almost any type of data, program, or content. Examples of files that may be uploaded include, for example, pictures, movies, songs, video games, documents, e-mails, and Internet Web pages. Files such as pictures, movies, songs, video, or other audio-visuals materials may be of particular interest because on-demand media servers are particularly suited for the delivery and presentation of audio-visuals to users.

Figure 14B:
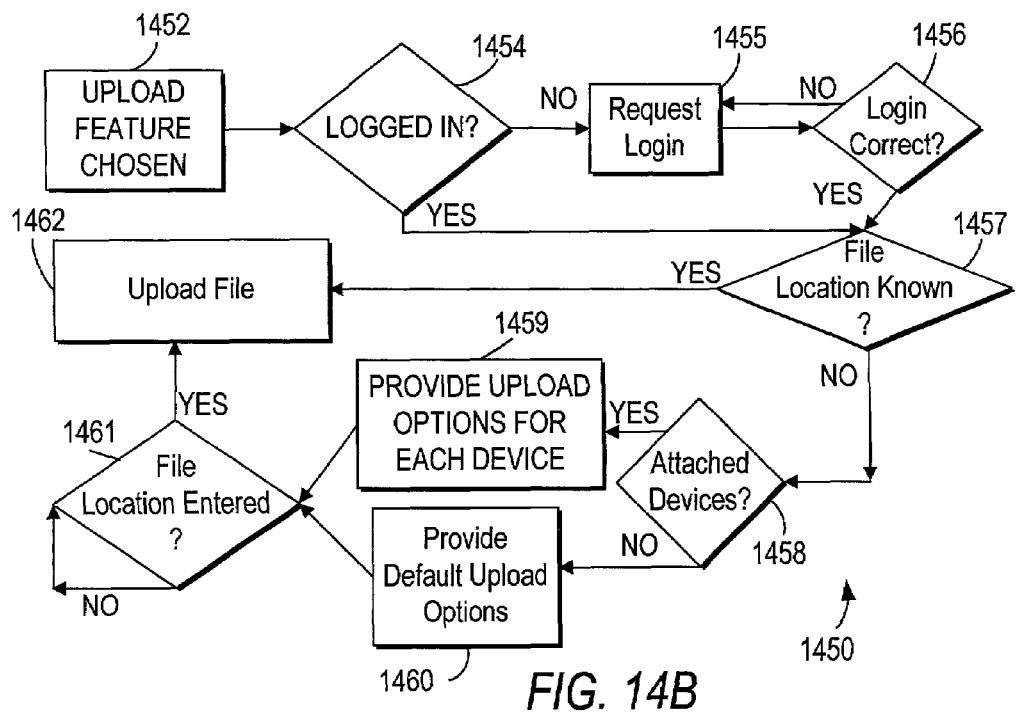
FIG. 14B is a flow chart illustrative of an upload file process in accordance with the principles of the present invention.

Process 1450 is illustrated in FIG. 14B to show illustrative steps that may be involved in uploading a file to a device such as a VOD server. At step 1452, a user may be provided with an opportunity to select an upload feature. At step 1454, the on-demand media system may check to see if a user is currently logged into the system. If a user is not currently logged in, user login may be requested at step 1455. At step 1456 the system may check to see whether the login was valid. The upload process may commence at step 1457 when the current user is logged into the system.

At step 1457, the system will determine if file location information has been given by the user. If desired, the system may search the user equipment for file source devices. If file source devices are found, appropriate upload options may be presented at step 1459. These options may be presented to a user in the form of device buttons 1420 of FIG. 14A. If no devices were found at step 1458, default options may be presented to the user at step 1460. Default options may include, for example, an Internet upload box or a list of possible storage devices that the user equipment may include. At step 1461, a user may be provided with an opportunity to select a file location for upload using the presented options. At step 1462, the selected file may be uploaded. If desired, at step 1472, the system may convert file formats for files that are being uploaded (e.g., convert JPG files to MPEG files) and/or may convert analog signals to digital file format.

Figure 15A:
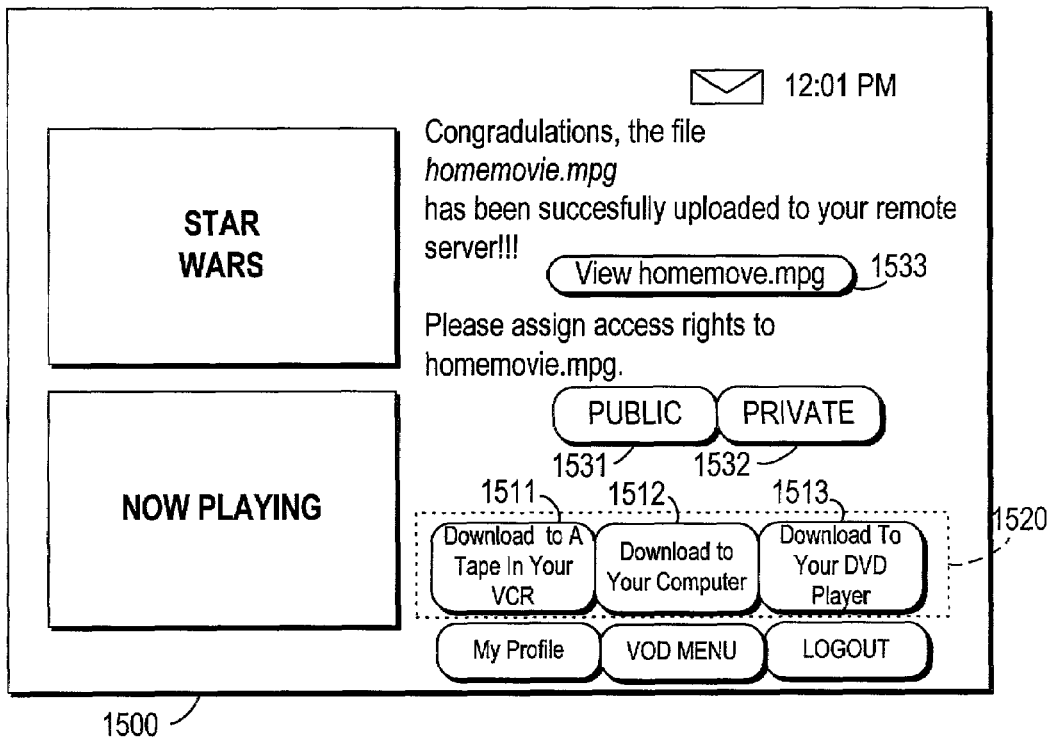
FIG. 15A is a diagram that is illustrative of a display screen for designating a file as public or private in accordance with the principles of the present invention.

After a file has been uploaded in step 1462, a user may want to assign access rights to that file. A user may also want to download the file to a different device in the on-demand media system. FIG. 15A is an illustration of display screen 1500 which may allow a user to download a recently uploaded file or to assign access rights to that file.

If a user desires to designate an uploaded file as a public file, public button 1531 may be selected. If a user desires to designate an uploaded file as a private file, private button 1532 may be selected. Download buttons 1520 may also be included in display screen 1500. If desired, the system may convert file formats for files that are downloaded (e.g., convert JPG files to MPEG files) and/or may provide digital to analog format conversions. Examples of such buttons may include for example, download to VCR button 1511, download to computer button 1512, and download to DVD player button 1513. If desired, however, the user may be presented with an option to have the file, which may be an audiovisual file, displayed or played back for the user. For example, the system may present the user with "view on your TV" option 1533, which may allow the user to view the file on the user's television set.

Files that are designated as private may be files that are associated with a particular user or with particular groups of users that have access rights to the file to the exclusion of others. Access may be limited to certain activities, which may include, for example, downloading, viewing, deleting, writing, and manipulating a file.

Figure 15B:
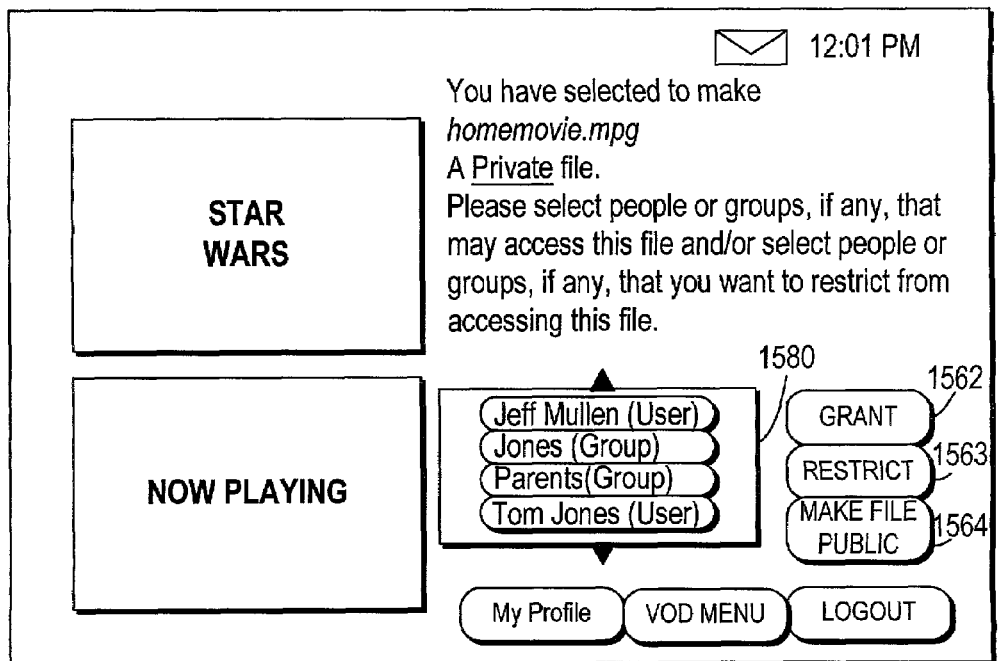
FIG. 15B is a diagram that is illustrative of a designate access data display screen in accordance with the principles of the present invention.

FIG. 15B illustrates display screen 1550, in which a user may grant and restrict access to particular users or groups of users in the on-demand media system. Display screen 1550 may include identity listings 1580 that contains a list of users and groups in the on-demand media system. After selecting a user or group from listings 1580 (e.g., by navigating on a listing and pressing a select key), a user may use grant button 1562 to grant access to a selected user or group. A user may select restrict button 1563 to restrict access to selected user or groups. If the user decides to make the file a public file, the user may select public button 1564.

Figure 16A:
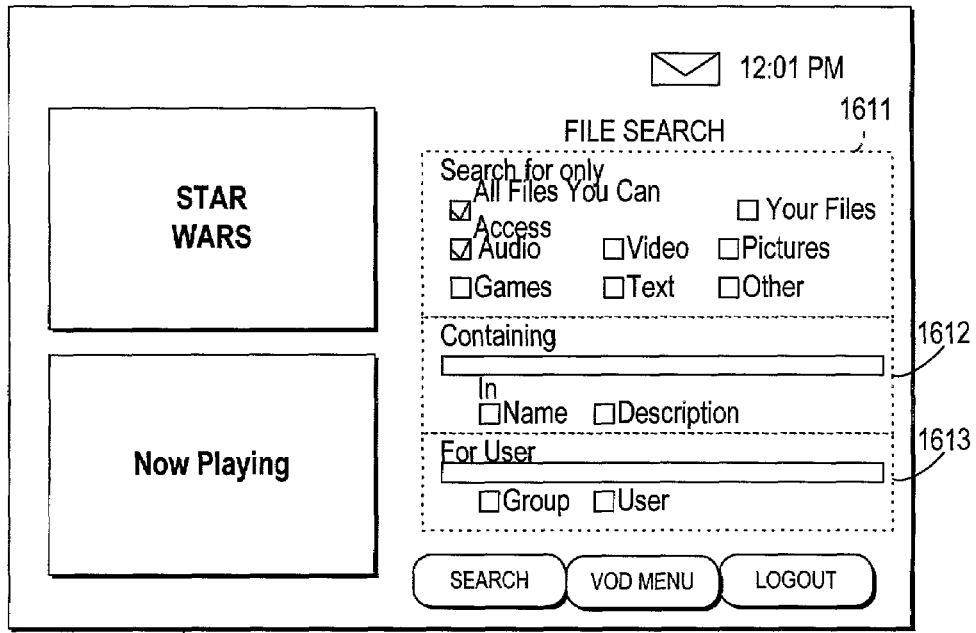
FIG. 16A is a diagram that is illustrative of a file search display screen in accordance with the principles of the present invention.

The on-demand media system may include a file search feature to aid users in locating files. FIG. 16A illustrates display screen 1600 from which a user may search for files on the on-demand media system. Display screen 1600 may contain search-type listings 1611. Listings 1611 may include options that allow a user to designate which types of files are to be located in a search. Examples of file types in listings 1611 may include, files to which the user has access rights, files associated with the current user, files for the presentation of audiovisuals such as pictures, games, or videos, or files for any other type of data.

Search listings 1612 may be included in display screen 1600 to give a user capabilities to narrow a search. A user may use listings 1612 to enter searchable text that may be associated with either a file's title or description. Identity search listings box 1613 may also be included in display screen 1600 to narrow a search even further. Box 1613 gives a user the capabilities to search for files associated with specific identities. After one or more files have been found by the on-demand media system, the user may download the file either to the remote server or to a device in the user equipment system.

Figure 16B:
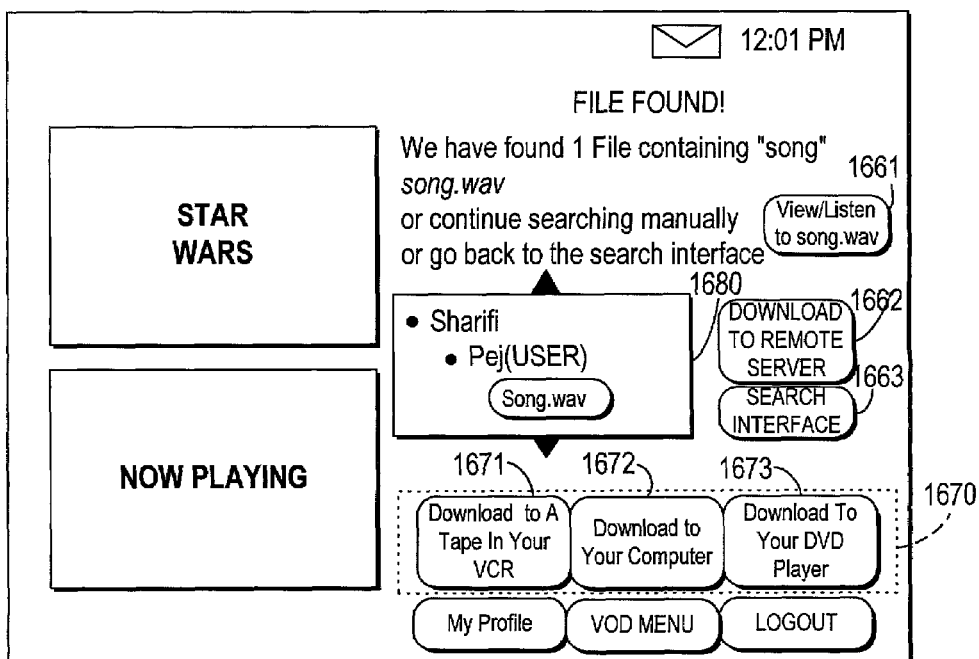
FIG. 16B is a diagram that is illustrative of a file found display screen in accordance with the principles of the present invention.

FIG. 16B is an illustration of display screen 1650 that allows a user to download files which were located in a file search. Display screen 1650 may contain found files listings box 1680, in which the found files may be listed. Box 1680 may list found files in any manner, such as alphabetically, and if desired may include a data or ownership hierarchy showing where the file was found in the system. Files from box 1680 may be downloaded to a remote server with the selection of a download button, such as download button 1662. For example, a user may select a file in box 1680 and then move a cursor to button 1662 to select that button. Device download buttons 1670 may also be included in display screen 1650 based on what devices are included in the currently-used user equipment. Download buttons may include for example, download to VCR button 1671, download to computer button 1672, download to DVD player button 1673, or any other suitable button for downloading files to a local device. If desired, the system may convert file formats for files that are downloaded (e.g., convert JPG files to MPEG files) and/or may provide digital to analog format conversions. Additionally, the user may be presented with view file option 1661, which may allow the user to view files located in the file search on the user equipment. See also "view on your TV" option 1533 of FIG. 15A, which essentially provides the same functionality.

For clarity and brevity, the features of the systems that are described herein are primarily discussed in the context of video-on-demand services. The features may also be implemented with other types of media on-demand services. Media on-demand services may be used to mass distribute movies, programs, music albums, etc. to users. User equipment and remote network servers may be configured for users to store personal media such as photographs, home videos, old recordings, or other media on a remote server for on-demand access by the user at a later time. The user as described above may associate desired access rights with the media that the user stores on the remote server.

Some or all of the features that are described herein may be implemented as part of an interactive television program guide, as part of a media on-demand application, as part of a dedicated application for those features; or implemented using a combination of such applications.

If desired, in connection with the relocate feature, the system may prompt a user to select whether to freeze on-demand-media of the user when the user is logging out of the system. Also, if desired, in connection with the relocate feature, the system may allow the user to resume the presentation of on-demand-media from a different point than the point at which the on-demand media may have been frozen. For example, the system may provide the user with an option to resume the presentation of on-demand media from the beginning of the media when the user relocates and exercise the relocate feature. The system may further allow the user to rewind the media past the point at which the media frozen.

The foregoing is merely illustrative of the principles of this invention and various modifications may be made by those skilled in the art without departing from the scope and spirit of the invention.

What is claimed is:

1. An interactive media-on-demand system, comprising:
    a plurality of user equipment that are each configured to present media-on-demand programming delivered from a remote media-on-demand server, configured to allow a user to request to freeze delivery of a media-on-demand program, and configured to allow the user to request to have the delivery resumed from the point at which the delivery was frozen; and
    the remote media-on-demand server being configured to deliver media-on-demand programming to each of the plurality of user equipment; configured to freeze the delivery of the media-on-demand program when the remote media-on-demand server receives a request to freeze delivery from a first one of the plurality of user equipment, configured to record the media-on-demand program when the request to freeze delivery is received from the first user equipment, and configured to resume the delivery to a second one of the plurality of user equipment when a request to resume delivery is received from the second user equipment,
    wherein resuming the delivery of the media-on-demand programming comprises delivering to the second user equipment from the remote media-on-demand server at least a portion of the recorded media-on-demand program.

2. The system of claim 1 wherein the remote media-on-demand server includes user-allocated storage space partitioned for different users to store user-specific data.

3. The system of claim 1 wherein at least the first one of the user equipment is configured to provide a relocate option to allow the user to request to freeze the delivery of the media-on-demand program.

4. The system of claim 1 wherein at least the second one of the user equipment is configured to provide an option to allow the user to request to have the delivery resumed.

5. The system of claim 1 wherein the remote media-on-demand server saves a current position of the media-on-demand program when the request to freeze delivery is received from the first one of the user equipment.

6. The system of claim 5 wherein the media-on demand program is resumed on the second one of the user equipment when the remote server retrieves the current position and plays the media-on-demand program on the second one of the user equipment starting from the current position.

7. The system of claim 1 wherein the media-on-demand presentation is resumed on the second user equipment when the remote media-on-delivery server retrieves the beginning of the recorded media-on-demand program and plays the media-on-demand program from the beginning of the recorded media-on-demand program on the second user equipment.

8. The system of claim 1 wherein the remote media-on-demand server and the plurality of user equipment are configured to provide the user with an opportunity to log into the system from the plurality of user equipment.

9. The system of claim 8 wherein the first one of the user equipment is configured to allow the user to freeze the delivery when the user has logged into the system.

10. The system of claim 8 wherein the second one of the user equipment is configured to allow the user to request to resume delivery when the user has logged into the system.

11. The system of claim 1 wherein the remote media-on-demand server and the plurality of user equipment are configured to provide the user with an opportunity to log out of the system from the plurality of user equipment.

12. The system of claim 11 wherein the first one of the user equipment is configured to provide a logout option to allow the user to log out of the system.

13. The system of claim 12 wherein the first one of the user equipment is configured to provide the user with an opportunity to request to freeze delivery in response to the logout option being selected.

14. The system of claim 1 wherein the remote media-on-demand server and the first one of the user equipment are configured to provide the user with an opportunity to upload that user's personal media from the first one of the user equipment to the remote media-on-demand server.

15. The system of claim 1 wherein remote media-on-demand server is configured to save the point at which the media-on-demand program was frozen to the a user-specific storage space on the remote media-on-demand server.

16. The system of claim 1 wherein the request to freeze delivery saves the point at which the media-on-demand program was frozen on the user-allocated storage space on the remote media-on-demand server.

17. A method, comprising:
    presenting a media-on-demand program on a first user equipment;
    freezing the presentation of the media-on-demand program upon a request to freeze delivery from the first user equipment;
    recording the media-on-demand program on a remote media-on-demand server when the request to freeze delivery is received from the first user equipment; and resuming the presentation of the media-on-demand program upon a request to resume delivery from a second user equipment,
wherein the remote media-on-demand server can communicate with the first and second user equipment, and
wherein resuming the presentation of the media-on-demand program comprises delivering to the second user equipment from the remote media-on-demand server at least a portion of the recorded media-on-demand program.

18. The method of claim 17 further comprising storing user-specific data in user-allocated storage space partitioned for different users in the remote media-on-demand server.

19. The method of claim 17 further comprising providing a relocate option on the first user equipment to allow a user to request to freeze the delivery of the media-on-demand program.

20. The method of claim 17 further comprising providing an option on the second user equipment to allow a user to request to resume delivery.

21. The method of claim 17 further comprising saving a current position of the media-on-demand program on the remote media-on-demand server when the request to freeze delivery is received.

22. The method of claim 21 wherein the resuming comprises:
retrieving the current position saved on the remote media-on-demand server; and
playing the media-on-demand program from the current position on the second user equipment.

23. The method of claim 17 wherein the resuming comprises:
retrieving the beginning of the recorded media-on-demand program; and
playing the media-on-demand program from the beginning of the recorded media-on-demand program on the second user equipment.

24. The method of claim 17 further comprising providing a user with an opportunity to log out of the system from the first user equipment.

25. The method of claim 24 wherein the providing the user with an opportunity to log out comprises providing a logout option.

26. The method of claim 25 further comprising providing the user with an opportunity to request to freeze delivery in response to the logout option being selected.

27. The method of claim 17 further comprising providing a user with an opportunity to upload that user's personal media from the first user equipment to the remote media-on-demand server.

28. The method of claim 17 further comprising saving the point at which the media-on-demand program was frozen in user-specific data on the remote media server when the request to freeze delivery is received by the remote media-on-demand server.

29. The method of claim 17 further comprising providing a user with an opportunity to log into the system through the second user equipment.

30. The method of claim 29 wherein the providing the user with the opportunity to log into the system comprises providing the user with an opportunity to enter personal identification information.

31. The method of claim 30 further comprising identifying the user based on the personal identification information.

32. The method of claim 30 further comprising providing the user with an opportunity to request to resume delivery when the user has logged into the system.

33. An interactive media-on-demand system, comprising:
a plurality of user equipment that are each configured to present media-on-demand programming delivered from a remote media-on-demand server, configured to allow a user to request to freeze delivery of a media-on-demand program, and configured to allow the user to request to have the delivery resumed from the point at which the delivery was frozen; and
the remote media-on-demand server being configured to deliver media-on-demand programming to each of the plurality of user equipment, configured to freeze the delivery of the media-on-demand program when the remote media-on-demand server receives a request to freeze delivery from a first one of the plurality of user equipment, and configured to resume the delivery to a second one of the plurality of user equipment when a request to resume delivery is received from the second user equipment,
wherein at least the first one of the user equipment is configured to provide a relocate option to allow the user to request to freeze the delivery of the media-on-demand program.

34. The system of claim 33 wherein the remote media-on-demand server includes user-allocated storage space partitioned for different users to store user-specific data.

35. The system of claim 33 wherein at least the second one of the user equipment is configured to provide an option to allow the user to request to have the delivery resumed.

36. The system of claim 33 wherein the remote media-on-demand server saves a current position of the media-on-demand program when the request to freeze delivery is received from the first one of the user equipment.

37. The system of claim 36 wherein the media-on demand program is resumed on the second one of the user equipment when the remote server retrieves the current position and plays the media-on-demand program on the second one of the user equipment starting from the current position.

38. The system of claim 33 wherein the remote media-on-demand server begins recording the media-on-demand program when the request to freeze delivery is received from the first user equipment.

39. The system of claim 38 wherein the media-on-demand presentation is resumed on the second user equipment when the remote media-on-delivery server retrieves the beginning of the recorded media-on-demand program and plays the media-on-demand program from the beginning of the recorded media-on-demand program on the second user equipment.

40. The system of claim 33 wherein the remote media-on-demand server and the plurality of user equipment are configured to provide the user with an opportunity to log into the system from the plurality of user equipment.

41. The system of claim 40 wherein the first one of the user equipment is configured to allow the user to request to freeze the delivery when the user has logged into the system.

42. The system of claim 40 wherein the second one of the user equipment is configured to allow the user to request to resume delivery when the user has logged into the system.

43. The system of claim 33 wherein the remote media-on-demand server and the plurality of user equipment are configured to provide the user with an opportunity to log out of the system from the plurality of user equipment.

44. The system of claim 43 wherein the first one of the user equipment is configured to provide a logout option to allow the user to log out of the system.

45. The system of claim 44 wherein the first one of the user equipment is configured to provide the user with the opportunity to request to freeze delivery in response to the logout option being selected.

46. The system of claim 33 wherein the remote media-on-demand server and the first one of the user equipment are configured to provide the user with an opportunity to upload that user's personal media from the first one of the user equipment to the remote media-on-demand server.

47. The system of claim 33 wherein remote media-on-demand server is configured to save the point at which the media-on-demand program was frozen to the a user-specific storage space on the remote media-on-demand server.

48. The system of claim 33 wherein the request to freeze delivery saves the point at which the media-on-demand program was frozen on the user-allocated storage space on the remote media-on-demand server.

49. A method, comprising:
presenting a media-on-demand program on a first user equipment;
providing a relocate option on the first user equipment to allow a user to request to freeze the delivery of the media-on-demand program;
freezing the presentation of the media-on-demand program upon a request to freeze delivery from the first user equipment; and
resuming the presentation of the media-on-demand program upon a request to resume delivery from a second user equipment,
wherein a remote media-on-demand server is in communication with the first and second user equipment.

50. The method of claim 49 further comprising storing user-specific data in user-allocated storage space partitioned for different users in the remote media-on-demand server.

51. The method of claim 49 further comprising providing an. option on the second user equipment to allow the user to request to resume delivery.

52. The method of claim 49 further comprising saving a current position of the media-on-demand program on the remote media-on-demand server when the request to freeze delivery is received.

53. The method of claim 52 wherein the resuming comprises:
retrieving the current position saved on the remote media-on-demand server; and
playing the media-on-demand program from the current position on the second user equipment.

54. The method of claim 49 further comprising recording the media-on-demand program on the remote media-on-demand server when the request to freeze delivery is received from the first user equipment.

55. The method of claim 54 wherein the resuming comprises:
retrieving the beginning of the recorded media-on-demand program; and
playing the media-on-demand program from the beginning of the recorded media-on-demand program on the second user equipment.

56. The method of claim 49 further comprising providing the user with an opportunity to log into the system through the second user equipment.

57. The method of claim 56 wherein the providing the user with the opportunity to log into the system comprises providing the user with an opportunity to enter personal identification information.

58. The method of claim 57 further comprising identifying the user based on the personal identification information.

59. The method of claim 57 further comprising providing the user with an opportunity to request to resume delivery when the user has logged into the system.

60. The method of claim 49 further comprising providing the user with an opportunity to log out of the system from the first user equipment.

61. The method of claim 60 wherein the providing the user with an opportunity to log out comprises displaying a display screen that includes providing a logout option.

62. The method of claim 61 further comprising providing the user with an opportunity to request to freeze delivery in response to the logout option being selected.

63. The method of claim 49 further comprising providing the user with an opportunity to upload that user's personal media from the first user equipment to the remote media-on-demand server.

64. The method of claim 49 further comprising saving the point at which the media-on-demand program was frozen in user-specific data on the remote media server when the request to freeze delivery is received by the remote media-on-demand server.

65. An interactive media-on-demand system, comprising:
a plurality of user equipment that are each configured to present media-on-demand programming delivered from a remote media-on-demand server, configured to allow a user to request to freeze delivery of a media-on-demand program, and configured to allow the user to request to have the delivery resumed from the point at which the delivery was frozen; and
the remote media-on-demand server being configured to deliver media-on-demand programming to each of the plurality of user equipment, configured to freeze the delivery of the media-on-demand program when the remote media-on-demand server receives a request to freeze delivery from a first one of the plurality of user equipment, and configured to resume the delivery to a second one of the plurality of user equipment when a request to resume delivery is received from the second user equipment, wherein:
the remote media-on-demand server and the plurality of user equipment are configured to provide the user with an opportunity to log out of the system from the plurality of user equipment,
the first one of the user equipment is configured to provide a logout option to allow the user to log out of the system, and
the first one of the user equipment is configured to provide the user with an opportunity to request to freeze delivery in response to the logout option being selected.

66. The system of claim 65 wherein the remote media-on-demand server includes user-allocated storage space partitioned for different users to store user-specific data.

67. The system of claim 65 wherein at least the first one of the user equipment is configured to provide a relocate option to allow the user to request to freeze the delivery of the media-on-demand program.

68. The system of claim 65 wherein at least the second one of the user equipment is configured to provide an option to allow the user to request to have the delivery resumed.

69. The system of claim 65 wherein the remote media-on-demand server saves a current position of the media-on-demand program when the request to freeze delivery is received from the first one of the user equipment.

70. The system of claim 69 wherein the media-on demand program is resumed on the second one of the user equipment when the remote server retrieves the current position and plays the media-on-demand program on the second one of the user equipment starting from the current position.

71. The system of claim 65 wherein the remote media-on-demand server begins recording the media-on-demand program when the request to freeze delivery is received from the first user equipment.

72. The system of claim 71 wherein the media-on-demand presentation is resumed on the second user equipment when the remote media-on-delivery server retrieves the beginning of the recorded media-on-demand program and plays the media-on-demand program from the beginning of the recorded media-on-demand program on the second user equipment.

73. The system of claim 65 wherein the remote media-on-demand server and the plurality of user equipment are configured to provide the user with an opportunity to log into the system from the plurality of user equipment.

74. The system of claim 73 wherein the first one of the user equipment is configured to allow the user to request to freeze the delivery when the user has logged into the system.

75. The system of claim 73 wherein the second one of the user equipment is configured to allow the user to request to resume delivery when the user has logged into the system.

76. The system of claim 65 wherein the remote media-on-demand server and the first one of the user equipment are configured to provide the user with an opportunity to upload that user's personal media from the first one of the user equipment to the remote media-on-demand server.

77. The system of claim 65 wherein remote media-on-demand server is configured to save the point at which the media-on-demand program was frozen to the a user-specific storage space on the remote media-on-demand server.

78. The system of claim 65 wherein the request to freeze delivery saves the point at which the media-on-demand program was frozen on the user-allocated storage space on the remote media-on-demand server.

79. A method, comprising:
presenting a media-on-demand program on a first user equipment;
providing a user with an opportunity to log out from the first user equipment by providing a logout option, whereby the user is provided with the opportunity to request to freeze delivery in response to the logout option being selected;
freezing the presentation of the media-on-demand program upon the request to freeze delivery from the user from the first user equipment; and
resuming the presentation of the media-on-demand program upon a request to resume delivery from a second user equipment,
wherein a remote media-on-demand server is in communication with the first and second user equipment.

80. The method of claim 79 further comprising storing user-specific data in user-allocated storage space partitioned for different users in the remote media-on-demand server.

81. The method of claim 79 further comprising providing a relocate option on the first user equipment to allow the user to request to freeze the delivery of the media-on-demand program.

82. The method of claim 79 further comprising providing an option on the second user equipment to allow the user to request to resume delivery.

83. The method of claim 79 further comprising saving a current position of the media-on-demand program on the remote media-on-demand server when the request to freeze delivery is received.

84. The method of claim 83 wherein the resuming comprises:
retrieving the current position saved on the remote media-on-demand server; and
playing the media-on-demand program from the current position on the second user equipment.

85. The method of claim 79 further comprising recording the media-on-demand program on the remote media-on-demand server when the request to freeze delivery is received from the first user equipment.

86. The method of claim 85 wherein the resuming comprises:
retrieving the beginning of the recorded media-on-demand program; and
playing the media-on-demand program from the beginning of the recorded media-on-demand program on the second user equipment.

87. The method of claim 79 further comprising providing the user with an opportunity to log into the system through the second user equipment.

88. The method of claim 87 wherein the providing the user with the opportunity to log into the system comprises providing the user with an opportunity to enter personal identification information.

89. The method of claim 88 further comprising identifying the user based on the personal identification information.

90. The method of claim 88 further comprising providing the user with an opportunity to request to resume delivery when the user has logged into the system.

91. The method of claim 79 further comprising providing the user with an opportunity to upload that user's personal media from the first user equipment to the remote media-on-demand server.

92. The method of claim 79 further comprising saving the point at which the media-on-demand program was frozen in user-specific data on the remote media server when the request to freeze delivery is received by the remote media-on-demand server.

* * * * *

UNITED STATES PATENT AND TRADEMARK OFFICE
CERTIFICATE OF CORRECTION

PATENT NO.         : 7,650,621 B2                                      Page 1 of 1
APPLICATION NO. : 09/974646
DATED              : January 19, 2010
INVENTOR(S)        : Thomas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2180 days.

Signed and Sealed this

Twenty-third Day of November, 2010

David J. Kappos
*Director of the United States Patent and Trademark Office*